United States Patent
Davis et al.

(10) Patent No.: US 12,478,623 B2
(45) Date of Patent: Nov. 25, 2025

(54) METHODS OF TREATING CENTRAL NERVOUS SYSTEM DISORDERS COMPRISING ADMINISTERING LUMATEPERONE AND A NITRIC OXIDE DONOR

(71) Applicant: INTRA-CELLULAR THERAPIES, INC., New York, NY (US)

(72) Inventors: Robert E. Davis, San Diego, CA (US); Gretchen Snyder, New York, NY (US); Peng Li, New Milford, NJ (US)

(73) Assignee: INTRA-CELLULAR THERAPIES, INC., Bedminster, NJ (US)

(*) Notice: Subject to any disclaimer, the term of this patent is extended or adjusted under 35 U.S.C. 154(b) by 820 days.

(21) Appl. No.: 17/764,070

(22) PCT Filed: Sep. 25, 2020

(86) PCT No.: PCT/US2020/052923
§ 371 (c)(1),
(2) Date: Mar. 25, 2022

(87) PCT Pub. No.: WO2021/062307
PCT Pub. Date: Apr. 1, 2021

(65) Prior Publication Data
US 2022/0362241 A1   Nov. 17, 2022

Related U.S. Application Data

(60) Provisional application No. 62/906,042, filed on Sep. 25, 2019.

(51) Int. Cl.
| | |
|---|---|
| *A61K 31/4985* | (2006.01) |
| *A61K 45/06* | (2006.01) |
| *A61P 25/08* | (2006.01) |
| *C07D 471/16* | (2006.01) |

(52) U.S. Cl.
CPC .......... *A61K 31/4985* (2013.01); *A61K 45/06* (2013.01); *A61P 25/08* (2018.01); *C07D 471/16* (2013.01)

(58) Field of Classification Search
CPC ..... A61K 31/4985; A61K 45/06; A61P 25/08; C07D 471/16
See application file for complete search history.

(56) References Cited

U.S. PATENT DOCUMENTS

| | | |
|---|---|---|
| 5,114,976 A | 5/1992 | Norden |
| 5,151,419 A | 9/1992 | Perenyi et al. |
| 6,548,493 B1 | 4/2003 | Robichaud et al. |
| 6,552,017 B1 | 4/2003 | Robichaud et al. |
| 6,699,852 B2 | 3/2004 | Robichaud et al. |
| 6,713,471 B1 | 3/2004 | Robichaud et al. |
| 6,849,619 B2 | 2/2005 | Robichaud et al. |
| 7,071,186 B2 | 7/2006 | Robichaud et al. |
| 7,081,455 B2 | 7/2006 | Robichaud et al. |
| 7,183,282 B2 | 2/2007 | Robichaud et al. |
| RE39,679 E | 6/2007 | Robichaud et al. |
| RE39,680 E | 6/2007 | Robichaud et al. |
| 7,238,690 B2 | 7/2007 | Robichaud et al. |
| 7,998,971 B2 | 8/2011 | Barlow et al. |
| 8,598,119 B2 | 12/2013 | Mates et al. |
| 8,648,077 B2 | 2/2014 | Tomesch et al. |
| 8,791,138 B2 | 7/2014 | Seeman et al. |
| 8,993,572 B2 | 3/2015 | Mates et al. |
| 9,168,258 B2 | 10/2015 | Mates et al. |
| 9,216,175 B2 | 12/2015 | Amancha et al. |
| 9,371,324 B2 | 6/2016 | Mates et al. |
| 9,428,506 B2 | 8/2016 | Mates et al. |
| 9,486,453 B2 | 11/2016 | Javitt |
| 9,586,960 B2 | 3/2017 | Tomesch et al. |
| 9,616,061 B2 | 4/2017 | Mates et al. |
| 9,708,322 B2 | 7/2017 | Li et al. |
| 9,745,300 B2 | 8/2017 | Mates et al. |
| 9,956,227 B2 | 5/2018 | Vanover et al. |
| 10,072,010 B2 | 9/2018 | Li et al. |
| 10,077,267 B2 | 9/2018 | Mates et al. |

(Continued)

FOREIGN PATENT DOCUMENTS

| | | | |
|---|---|---|---|
| CN | 109867674 A | 6/2019 | |
| WO | WO-2015085004 A1 * | 6/2015 | ........... A61K 31/437 |

(Continued)

OTHER PUBLICATIONS

Hallak et al.; Rapid Improvement of Acute Schizophrenia Symptoms After Intravenous Sodium Nitroprusside, JAMA Psychiatry (Year: 2013).*
CAS Registry File (Registry No. 313368-91-1, entered into STN Jan. 10, 2021, accessed from the internet on Feb. 26, 2025) (Year: 2001).*
"ACNP 58th Annual Meeting: Poster Session II: Abstracts Collection" Neuropsychopharmacology, vol. 44, p. 230-384, (2019); 3 parts.
Hallak et al., "Rapid Improvement of Acute Schizophrenia Symptoms After Intravenous Sodium Nitroprusside: A Randomized, Double-blind, Placebo-Controlled Trial," JAMA Psychiatry, vol. 70, No. 7, p. E1-E9, (2013).
Krogmann et al., "Keeping Up with the Therapeutic Advances in Schizophrenia: A Review of Novel and Emerging Pharmacological Entities," CNS Spectrums: CME Review Article, vol. 24, No. S1, p. 38-69, (2019).
Störm et al., "Antipsychotic-like Effect of Lumateperone is Enhanced by Sodium Nitroprusside in the Conditioned Avoidance Response Test," 1 page, (2020); Retrieved from http://www.diva-portal.org/smash/record.jsf?pid=diva2:1452727&dswid=8037; Abstract Only.

(Continued)

*Primary Examiner* — Jeffrey H Murray
*Assistant Examiner* — Daniel John Burkett
(74) *Attorney, Agent, or Firm* — Hoxie & Associates LLC

(57) ABSTRACT

The disclosure provides methods for the for treatment of psychosis, such as schizophrenia, or depression (such as bipolar depression) and/or anxiety, comprising administering to a patient in need thereof, (i) a 5-HT$_{2A}$ or 5-HT$_{2A}$/D2 receptor ligand, for example a substituted heterocycle fused gamma-carboline as described herein, in free, pharmaceutically acceptable salt or prodrug form, and (ii) a nitric oxide donor, separately (sequentially or simultaneously), or in combination (e.g., in a fixed dose combination).

12 Claims, 4 Drawing Sheets

(56) References Cited

U.S. PATENT DOCUMENTS

| | | | |
|---|---|---|---|
| 10,117,867 B2 | 11/2018 | Mates et al. | |
| 10,322,134 B2 | 6/2019 | Vanover et al. | |
| 10,464,938 B2 | 11/2019 | Tomesch et al. | |
| 10,472,359 B2 | 11/2019 | Li et al. | |
| 10,597,394 B2 | 3/2020 | Mates et al. | |
| 10,597,395 B2 | 3/2020 | Tomesch et al. | |
| 10,654,854 B2 | 5/2020 | Li et al. | |
| 10,682,354 B2 | 6/2020 | Wennogle | |
| 10,688,097 B2 | 6/2020 | Yao et al. | |
| 10,695,345 B2 | 6/2020 | Li et al. | |
| 10,702,522 B2 | 7/2020 | Mates et al. | |
| 10,716,786 B2 | 7/2020 | Li et al. | |
| 10,844,061 B2 | 11/2020 | Li et al. | |
| 10,899,762 B2 | 1/2021 | Mates et al. | |
| 10,960,009 B2 | 3/2021 | Vanover et al. | |
| 10,960,010 B2 | 3/2021 | Vanover et al. | |
| 11,014,925 B2 | 5/2021 | Li et al. | |
| 11,026,951 B2 | 6/2021 | Mates et al. | |
| 11,052,083 B2 | 7/2021 | Li et al. | |
| 11,052,084 B2 | 7/2021 | Li et al. | |
| 11,053,245 B2 | 7/2021 | Mates et al. | |
| 11,096,944 B2 | 8/2021 | Yao et al. | |
| 11,124,514 B2 | 9/2021 | Mates et al. | |
| RE48,825 E | 11/2021 | Tomesch et al. | |
| RE48,839 E | 12/2021 | Mates et al. | |
| 11,292,793 B2 | 4/2022 | Peddy et al. | |
| 11,311,536 B2 | 4/2022 | Li et al. | |
| 11,331,316 B2 | 5/2022 | Li et al. | |
| 11,376,249 B2 | 7/2022 | Li et al. | |
| 11,427,587 B2 | 8/2022 | Li et al. | |
| 11,440,911 B2 | 9/2022 | Wennogle et al. | |
| 11,560,382 B2 | 1/2023 | Mates et al. | |
| 11,680,065 B2 | 6/2023 | Li et al. | |
| 11,690,842 B2 | 7/2023 | Li et al. | |
| 11,723,909 B2 | 8/2023 | Yao et al. | |
| 11,753,419 B2 | 9/2023 | Li et al. | |
| 11,806,347 B2 | 11/2023 | Li et al. | |
| 11,806,348 B2 | 11/2023 | Li et al. | |
| 11,957,791 B2 * | 4/2024 | Li | A61K 9/2013 |
| 11,958,852 B2 | 4/2024 | Mates et al. | |
| 11,980,617 B2 | 5/2024 | Snyder et al. | |
| 12,070,459 B2 | 8/2024 | Li et al. | |
| 12,090,155 B2 | 9/2024 | Mates et al. | |
| 12,122,792 B2 | 10/2024 | Li et al. | |
| 12,128,043 B2 | 10/2024 | Li et al. | |
| 12,144,808 B2 | 11/2024 | Li et al. | |
| 12,194,044 B2 | 1/2025 | Yao et al. | |
| 12,195,464 B2 | 1/2025 | Li | |
| 2003/0144319 A1 | 7/2003 | Bigge et al. | |
| 2004/0009970 A1 | 1/2004 | Ramamoorthy | |
| 2005/0058703 A1 | 3/2005 | Chang et al. | |
| 2007/0037815 A1 * | 2/2007 | Tung | A61P 7/00 514/249 |
| 2008/0287450 A1 | 11/2008 | Cid-Nunez et al. | |
| 2014/0080816 A1 | 3/2014 | Koolman et al. | |
| 2015/0374684 A1 | 12/2015 | Javitt et al. | |
| 2019/0211015 A1 | 7/2019 | Mittelman et al. | |
| 2020/0148683 A1 | 5/2020 | Peddy et al. | |
| 2020/0157100 A1 | 5/2020 | Li | |
| 2021/0008065 A1 | 1/2021 | Li et al. | |
| 2021/0060009 A1 | 3/2021 | Snyder et al. | |
| 2021/0186962 A1 | 6/2021 | Davis et al. | |
| 2022/0024924 A1 | 1/2022 | Janton et al. | |
| 2023/0372336 A1 | 11/2023 | Dutheil et al. | |
| 2024/0091224 A1 | 3/2024 | Li et al. | |
| 2024/0122924 A1 | 4/2024 | Dutheil et al. | |

FOREIGN PATENT DOCUMENTS

| | | |
|---|---|---|
| WO | 2017/120012 A1 | 7/2017 |
| WO | 2020/182978 A1 | 9/2020 |

OTHER PUBLICATIONS

Titulaer et al., "Rapid Augmentation of Antipsychotic Drugs by Sodium Nitroprusside (SNP). Behavioral Assessment and Effect on Brain Dopaminergic Transmission in Rats," Abstract Leaflet—18th International Forum on Mood and Anxiety Disorders, Vienna, Austria, Jul. 4-6, 2019, 18 pages.

"Keeping Up with the Therapeutic Advances in Schizophrenia: A Review of Novel and Emerging Pharmacological Entities," CNS Spectrums, MBL Communications, vol. 24, No. S1, pp. 38-69, (2019).

Barman, R. et al., "Newer Antipsychotics: Brexpiprazole, Cariprazine, and Lumateperone: A Pledge or Another Unkept Promise?," World J. Psychiatr., vol. 11, No. 12, pp. 1228-1238, (2021).

Cole et al., "ITI-007. 5HT2A Receptor Antagonist, Dopamine D2 Receptor Modulator, Treatment of Schizophrenia, Treatment of Insomnia," Drugs of the Future, vol. 40, No. 1, p. 643-650, (2015).

Correll, C. et al., "Efficacy and Safety of Lumateperone for Treatment of Schizophrenia A Randomized Clinical Trial," JAMA Psychiatry, vol. 77, No. 4, pp. 349-358, (2020).

Davis, R. et al., "ITI-007 demonstrates brain occupancy at serotonin 5-HT2A and dopamine D2 receptors and serotonin transporters using positron emission tomography in healthy volunteers," Psychopharmacology, vol. 232, pp. 2863-2872, (2015); DOI: 10.1007/s00213-015-3922-1.

Davis, R. et al., "Lumateperone (ITI-007), A Novel Drug in Development for the Treatment of Agitation in Patients with Dementia, including Alzheimer's Disease: Rationale and Clinical Design," The Journal of Prevention of Alzheimer's Disease, 4(4):372 (2017) (Clinical Trials in Alzheimer's Disease (CTAD) Congress, Symposium Summary P93).

Dutheil, S., et al. "Lumateperone Normalizes Pathological Levels of Acute Inflammation through Important Pathways Known to Be Involved in Mood Regulation," The Journal of Neuroscience, vol. 43, No. 5, pp. 863-877, (2023).

Edinoff, A. et al., "Lumateperone for the Treatment of Schizophrenia," Psychopharmacology Bulletin, vol. 50, No. 4, pp. 32-59, (2020).

Harvey, P. et al., "Lumateperone Improves Negative Symptoms Related to Emotional Experience (Avolition) in Patient with Schizophrenia," Abstract presented at the American Society of Clinical Psychopharmacology (ASCP) Annual Meeting: May 29-Jun. 1, 2018: Miami, FL.

Longo, G. et al., "The Novel Antipsychotic Lumateperone (Iti-007) in the Treatment of Schizophrenia: A Systematic Review," Brain Sciences, vol. 13, No. 12, 18 pages, (2023).

Mazza, M. et al., "Evidence on the New Drug Lumateperone (ITI-007) for Psychiatric and Neurological Disorders," CNS & Neurological Disorders—Drug Targets, vol. 19, pp. 243-247, (2020).

Menard, C. et al., "Social stress induces neurovascular pathology promoting depression," Nature Neuroscience, vol. 20, pp. 1752-1760, (2017).

Snyder, G. et al., "Chapter 11: A review of the pharmacology and clinical profile of lumateperone for the treatment of schiophrenia," Advances in Pharmacology, vol. 90, pp. 253-276, 31 pages, (2021).

Suppes, T. et al., "Adjunctive lumateperone (ITI-007) in the treatment of bipolar depression: Results from a randomized placebo-controlled clinical trial," Bipolar Disorders, vol. 25, pp. 478-488, 11 pages, (2023).

Vanover, K. et al., "50. ITI-007, an Investigational New Antipsychotic Drug with a Novel Pharmacological Profile, is Safe and Well-Tolerated with Early Clinical Signs for Efficacy in Patients with Stabilized Schizophrenia," Abstract presented at the ANCP 49th Annual Conference in Poster Session III; Dec. 8, 2010; pp. S321-S322; Neuropsychopharmacology, vol. 35, (2010).

Vanover, K. et al., "Safety, Pharmacokinetics and Early Signals for Efficacy with ITI-007, A Novel Investigational New Drug for the Treatment of Schizophrenia and Related Disorders," Schizophrenia Bulletin, vol. 37, Suppl. 1, p. 325, (2011), Abstract only.

Vanover, K. et al., "T184. Long-Term Safety for Lumateperone (ITI-007) in the Treatment of Schizophrenia," ANCP 57th Annual Meeting: Poster Session II, 4 pages, (2018).

(56) References Cited

OTHER PUBLICATIONS

Vanover, K. et al., "W201. Efficacy and Safety of Lumateperone 42 mg in the Treatment of Schizophrenia: A Pooled Analysis of Randomized Clinical Trials," ACNP 58th Annual Meeting: Poster Session III, vol. 44, Suppl. 1, pp. 492-494, Dec. 5, 2019.

Vanover, K. et al., "Lumateperone (ITI-007): A Novel Investigational Agent with Broad Therapeutic Potential Across Multiple Neuropsychiatric Disorders," European Neuropsychopharmacology, vol. 27, pp. S660-S661 (2017) (Summary of ECNP Poster P.1.g.038).

Vanover, K. et al., Abstracts of the 13th International Congress on Schizophrenia (ICOSR) (Apr. 2-6, 2011), Schizophrenia Bull., vol. 37, Suppl. 1., p. 325, (2011).

Witkin, J. et al., "Chapter 3: Rapid-acting Antidepressants," Advances in Pharmacology, vol. 86, 50 pages, (2019).

"Clinical Trial Evaluating ITI-007 as an Adjunctive Therapy to Lithium or Valproate for the Treatment of Bipolar Depression," ClinicalTrials.gov, 6 pages, Nov. 9, 2015.

"Highlights of Prescribing Information CAPLYTA (lumateperone) capsules, for oral use," Label—Prescribing Information, 16 pages, (2019); https://www.accessdata.fda.gov/drugsatfda_docs/label/2019/209500s000lbl.pdf.

Aiken, C., "An Overview of Atypical Antipsychotics for Bipolar Depression," published on Jan. 3, 2020 at https://www.psychiatrictimes.com/view/overview-atypical-antipsychotics-bipolar-depression, 11 pages.

Corponi, F. et al., "Novel Antipsychotics Specificity Profile: A Clinically Oriented Review of Lurasidone, Brexpiprazole, Cariprazine and Lumateperone," European Neuropsychopharmacology, vol. 29, pp. 971-998, (2019).

Kendrick, T., "The Newer, 'Atypical' Antipsychotic Drugs—Their Development and Current Therapeutic Use," British J. General Practice, vol. 49, pp. 745-749, (1999).

McIntyre, R. et al., "The Efficacy of Lumateperone in Patients with Bipolar Depression with Mixed Features," J Clin Psychiatry, vol. 84, No. 3, 10 pages, (2023).

McIntyre, R. et al., "The Efficacy of Lumateperone on Symptoms of Depression in Bipolar I and Bipolar II Disorder: Secondary and Post Hoc Analyses," European Neuropsychopharmacology, vol. 68, pp. 78-88, (2023).

Press Release, "Intra-Cellular Therapies Announces Positive Top-Line Results from a Phase 3 Trial of Lumateperone in Patient with Bipolar Depression," Intra-Cellular Therapies, Press Release Date: Jul. 8, 2019.

Press Release, "Intra-Cellular Therapies Announces Top-Line Results from the Second Phase 3 Trial of ITI-007 in Patients with Schizophrenia (Study '302)", Intra-Cellular Therapies, Press Release Date: Sep. 28, 2016, 8 pages, available at: https://globenewswire.com/news-release/2016/09/28/875435/0/en/Intra-Cellular-Therapies-Announces-Top-Line-Results-from-the-Second-Phase-3-Trial-of-ITI-007-in-Patients-with-Schizophrenia-Study-302.html.

Press Release, "Intra-Cellular Therapies Presents Data on Symptom Improvement by Lumateperone on Negative Symptoms, Depression, and Social Function in Patients with Schizophrenia at the American Society of Clinical Psychopharmacology (ASCP) Annual Meeting," Intra-Cellular Therapies, Press Release Date: May 31, 2018, (https://ir.intracellulartherapies.com/newsreleases/.

Satlin, A. et al., "W203: Additional Results from a 12-Month Open-Label Safety Study of Lumateperone (ITI-007) in Patients with Stable Symptoms of Schizophrenia," ACNP 58th Annual Meeting: Poster Session III, vol. 44, Suppl. 1, pp. 493-494, (2019).

Silver, H. et al., "Multifunctional Pharmacotherapy: What Can We Learn from Study of Selective Serotonin Reuptake Inhibitor Augmentation of Antipsychotics in Negative-Symptom Schizophrenia?," Neurotherapeutics, vol. 6, pp. 86-93, (2009).

Sowa-Kucma, M. et al., "Exploring the Pharmacological and Clinical Features of Lumateperone: A Promising Novel Antipsychotic," International journal of Molecular Sciences, vol. 25, 13289, 13 pages, (2024).

Calabrese et al., "Efficacy and Safety of Lumateperone for Major Depressive Episodes Associated with Bipolar I or Bipolar II Disorder: A Phase 3 Randomized Placebo-Controlled Trial," American Journal of Psychiatry, vol. 178, No. 12, p. 1098-1106, (2021), published online Sep. 23, 2021, <<https://doi.org/10.1176/appi.ajp.2021.20091339>>.

"Clinical Trial Evaluating ITI-007 (Lumateperone) as a Monotherapy for the Treatment of Bipolar," ClinicalTrials.gov (Identifier: NCT02600494), 5 pages, (2015).

Davis, et al., "ITI-007 in the Treatment of Schizophrenia: From Novel Pharmacology to Clinical Outcomes," *Expert Review of Neurotherapeutics*, vol. 16, No. 6, pp. 601-614, (2016).

Davis et al., "Rationale for the Development of Low Doses of ITI-007 for the Treatment of Behavioral Disturbances Associated with Dementia," The Journal of Prevention of Alzheimer's Disease, 2(4):302 (2015) (Clinical Trials in Alzheimer's Disease (CTAD) Congress, Symposium Summary OC51).

Davis, et al., "ITI-007 demonstrates brain occupancy at serotonin 5-HT2A and dopamine D2 receptors and serotonin transporters using positron emission tomography in healthy volunteers," Psychopharmacology, vol. 232, pp. 2863-2872, (2015); DOI: 10.1007/s00213-015-3922-1.

Davis, et al., "Lumateperone (ITI-007), A Novel Drug in Development for the Treatment of Agitation in Patients with Dementia, including Alzheimer's Disease: Rationale and Clinical Design," The Journal of Prevention of Alzheimer's Disease, 4(4):372 (2017) (Clinical Trials in Alzheimer's Disease (CTAD) Congress, Symposium Summary P93.

Gramigna, J, "Lumateperone Safe, Effective for Depressive Symptoms Among Patients with Bipolar Disorders," American Society of Clinical Psychopharmacology Annual Meeting, Jun. 2, 2020, 3 pages.

Hlavinka, E., "Schizophrenia Tx Eases Depression in Bipolar Disorder: Lumateperone Offers Greater Rate of Response, Remission versus Placebo," Medpage Today, 7 pages, (2020); https://www.medpagetoday.com/meetingcoverage/psychcongress/88584.

Keefer, L., "Fifty Years of Diazeniumdiolate Research. From Laboratory Curiosity to Broad-Spectrum Biomedical Advances," ACS Chem Biol., vol. 6, p. 1147-1155, (2011).

Khorana, et al., "Gamma-Carbolines: Binding at 5-HT5A Serotonin Receptors," *Bioorganic & Medicinal Chemistry*, vol. 11, pp. 717-722, p. 718 Table 1, (2003).

Kumar et al., "Lumateperone: A New Treatment Approach for Neuropsychiatric Disorders," Drugs of Today, vol. 54, No. 12, p. 713-719, (2018).

Lee, et al. "Novel, Highly Potent, Selective 5-HT$_{2A}$/D$_2$ Receptor Antagonists as Potential Atypical Antipsychotics," *Bioorg. Med. Chem. Lett.*, vol. 13, pp. 767-770, (2003).

Li, et al., "Discovery of a Tetracyclic Quinoxaline Derivative as a Potent and Orally Active Multifunctional Drug Candidate for the Treatment of Neuropsychiatric and Neurological Disorders," *Journal of Medicinal Chemistry*, vol. 57, pp. 2670-2682, (2014).

Lieberman, J.A., et al., "ITI-007 for the Treatment of Schizophrenia: A 4-Week Randomized, Double-Blind, Controlled Trial," Biol. Psychiatry, vol. 79, No. 12, pp. 952-961, (2015).

Marek et al. Synergistic Action of 5-HT2A Antagonists and Selective Serotonin Reuptake Inhibitors in Neuropsychiatric Disorders. Neuropsychopharmacology, 2003. vol. 28, pp. 402-412. (Year: 2003).

McIntyre et al., "Rapid-acting Antidepressants in Psychiatry: Psychedelics, Episodic Treatments, Innovation, and Clarion Call for Methodologic Rigor in Drug Development," Expert Opinion on Drug Safety, vol. 21, No. 6, p. 715-716, (2022).

Miller et al., "Recent Developments in Nitric Oxide Donor Drugs," British Journal of Pharmacology, vol. 151, p. 305-321, (2007).

Press Release, "Intra-Cellular Therapies Announces Additional Results from Phase I/II Clinical Trial for ITI-007 in Healthy Geriatric Subjects and Patients with Dementia," Intra-Cellular Therapies, Press Release Date: Nov. 21, 2014, (http://ir.intracellulartherapies.com/releasedetail.cfm?ReleaseID=884325), accessed on May 31, 2016.

Satlin, et al., "ITI-007 (Lumateperone) for the Treatment of Agitation in Patients with Dementia, including Alzheimer's Disease,"

(56) References Cited

OTHER PUBLICATIONS

Alzheimer's & Dementia 14(7) (Suppl.): P678-79 (2018) (Alzheimer's Assoc. International Conference 2018, summary of Poster P2-032).

Seabra et al., "Nitric Oxide Donors for Prostate and Bladder Cancers: Current State and Challenges," European Journal of Pharmacology, vol. 826, p. 158-168, (2018).

Snyder, et al., "Functional Profile of a Novel Modulator of Serotonin, Dopamine, and Glutamate Neurotransmission," *Psychopharmacology*, vol. 232, pp. 605-621, (2015); Published online Aug. 2014, DOI 10.1007/s00213-014-3704-1.

Titulaer et al., "Sodium Nitroprusside Enhances the Antipsychotic-like Effect of Lumateperone in the Conditioned Avoidance Response Test," Neuropsychopharmacology (Dec. 5, 2019) 44 (Suppl 1):333-334 (Abstract T197, ACNP 58th Annual Meeting, Orlando, FL., Dec. 8-11, 2019).

Titulaer et al., "Enhancement of the Antipsychotic Effect of Risperidone by Sodium Nitroprusside in Rats," European Neuropsychopharmacology, vol. 29, p. 1282-1287, (2019).

Vanover, et al., "A Novel Approach to Address an Unmet Need in the Treatment of Schizophrenia and Depression: Lumateperone, an Innovative Modulator of Dopamine, Serotonin, and Glutamate," Abstract presented at the American Society of Clinical Psychopharmacology (ASCP) Annual Meeting; May 29-Jun. 1, 2018; Miami, FL.

Vanover, K., et al., "ITI-007: A Novel Therapy for the Treatment of Schizophrenia and Related Psychoses," International Clinical Psychopharmacology, vol. 26, e56, 1 page, (2011).

Vyas, P., et al., "An Evaluation of Lumateperone Tosylate for the Treatment of Schizophrenia," Expert Opinion on Pharmacotherapy, vol. 21, No. 2, pp. 139-145, (2020); https://doi.org/10.1080/14656566.2019.1695778.

Wang et al., "Rapid-acting Antidepressants Targeting Modulation of the Glutamatergic System: Clinical and Preclinical Evidence and Mechanisms," General Psychiatry, vol. 35, No. e100922, 6 pages (2022).

Warner-Schmidt et al., "Antidepressant Effects of Selective Serotonin Reuptake Inhibitors (SSRIs) are Attenuated by Antiinflammatory Drugs in Mice and Humans," PNAS, vol. 108, No. 22, p. 9262-9267 (2011).

Wennogle, et al., "Activation of NMDA and AMPA Receptors by Lumateperone (ITI-007): Implications for Antidepressant Activity," Abstract presented at the 2017 Collegium Internationale Neuro-Psychopharmacologicum (CINP) Thematic Meeting: Treatment Resistant Depression; Jul. 20-22, 2017; Prague.

* cited by examiner

METHODS OF TREATING CENTRAL NERVOUS SYSTEM DISORDERS COMPRISING ADMINISTERING LUMATEPERONE AND A NITRIC OXIDE DONOR

CROSS REFERENCE TO RELATED APPLICATIONS

This application is a U.S. National Stage Application under 35 U.S.C. § 371 of International Application No. PCT/US2020/052923, which was filed on Sep. 25, 2020, which claims priority to and the benefit of U.S. Provisional Application Ser. No. 62/906,042, which was filed on Sep. 25, 2019, the contents of each of which are hereby incorporated by reference in their entireties.

TECHNICAL FIELD

The present disclosure relates to use of (i) a $5-HT_{2A}$ or $5-HT_{2A}/D2$ receptor ligand, for example a substituted heterocycle fused gamma-carboline as described herein, in free, pharmaceutically acceptable salt or prodrug form, and (ii) a nitric oxide donor, separately (sequentially or simultaneously), or in combination (e.g., in a fixed dose combination) for treatment of psychosis, such as schizophrenia, or depression (such as bipolar depression) and/or anxiety.

BACKGROUND OF THE INVENTION

Recent psychiatric genomic studies imply that major psychiatric disorders such as schizophrenia, bipolar disorder and major depressive disorder (MDD), which are currently classified into distinct disorder categories, show both clinical overlap and familial co-aggregation and share genetic risk factors. Potential mechanisms underlying this clinical overlap have also emerged and implicate genes involved in neurodevelopment, synaptic plasticity and cognitive functions.

Accumulated preclinical and clinical data over the past few decades collectively delineate a major role for prefrontal dopamine and D1 receptors as well as serotonin and glutamatergic NMDA receptor-mediated transmission in the above-mentioned cognitive modalities and evidence for a partly overlapping dysfunction of these transmitters and receptors in schizophrenia and MDD has emerged. Thus, combinations of atypical antipsychotic drugs (APDs), which mostly display potent $5-HT_{2A}$ and more modest D2 receptor blocking properties and antidepressant drugs such as selective serotonin reuptake inhibitors (SSRIs), are frequently used in these mental disorders, albeit in treatment-resistant depression (TRD) with lower APD dosage. Previous studies have shown that this drug combination activates both dopamine release and a D1 receptor-mediated glutamatergic NMDA-receptor mediated transmission in the prefrontal cortex (PFC) even at a relatively low D2 occupancy.

Add-on treatment with low to modest doses of atypical APDs to SSRIs in TRD potently augments the antidepressant effect with a rapid onset of action. However, the rapid and potent antidepressant effect of ketamine is critically dependent on glutamatergic AMPA-receptor activation in the PFC, which drives the activation of the mTOR pathway and the associated increased synapse number and function that in turn reverses the synaptic deficits in TRD.

Recent data shows that the above-mentioned drug combinations exert the same effect as ketamine in this regard, exemplified by a combination of olanzapine and fluoxetine or brexpiprazole and escitalopram, also reversed alterations in the BDNF-TrkB signaling and dendritic spine density in the PFC in an inflammatory model of secondary depression.

Accumulating evidence suggests that inflammation plays a role in the pathophysiology of mood disorders including bipolar and unipolar depressive disorder. Elevated levels of proinflammatory cytokines, such as interleukin-1β (IL-1β), tumor necrosis factor α (TNF-α) and in particular interleukin 6 (IL-6) have been found in serum/plasma and CSF of depressed patients also in the absence of co-morbid medical illness. In addition, stimulation of the immune system with lipopolysaccharide (LPS) can elicit symptoms of depression even in humans with no previous episodes of depression. Several findings indicate a pathophysiological role of IL-6 in depression, especially in patients who fail to respond to SSRIs.

Preclinically, peripheral administration of LPS can induce depression-like behavior in rodents and is associated with the induction of inflammation, thus providing an animal model of inflammation associated dysphoria. Moreover, LPS-induced depression-like behavior can be blocked by pretreatment with SSRIs and serotonin-norepinephrine reuptake inhibitors (SNRIs). A different but complementary experimental approach is to use the Flinders Sensitive Line (FSL) of rats, which provides a genetically-defined animal model of depression with many behavioral and neurochemical similarities to human depression. The FSL rats also appears to exhibit increased neuroinflammation as marked by increases in brain levels of leptin, IL-1a and BDNF.

Substituted heterocycle fused gamma-carbolines such as lumateperone are known to be $5-HT_{2A}$ or $5-HT_{2A}/D2$ receptor ligands, which are useful in treating central nervous system disorders. These compounds antagonize the serotonin-2A ($5-HT_{2A}$) receptor, and/or modulate dopamine receptor signaling at the level of key intra-cellular phosphoproteins. Such compounds are principally known to be useful for the treatment of positive and negative symptoms of schizophrenia. At dopamine D2 receptors, these compounds have dual properties and act as both post-synaptic antagonists and pre-synaptic partial agonists. They also stimulate phosphorylation of glutamatergic NMDA NR2B, or GluN2B, receptors in a mesolimbic specific manner. It is believed that this regional selectivity in the brain areas thought to mediate the efficacy of antipsychotic drugs, together with the serotonergic, glutamatergic, and dopaminergic interactions, may result in antipsychotic efficacy for positive, negative, affective and cognitive symptoms associated with schizophrenia. The compounds also exhibit serotonin reuptake inhibition, providing antidepressant activity for the treatment of schizoaffective disorder, co-morbid depression, and/or as a stand-alone treatment for major depressive disorder. The $5-HT_{2A}$ or $5-HT_{2A}/D2$ receptor ligands as described are also useful for the treatment of bipolar disorder and other psychiatric and neurodegenerative disorders, particularly behavioral disturbances associated with dementia, autism and other CNS diseases. These features may be able to improve the quality of life of patients with schizophrenia and enhance social function to allow them to more fully integrate into their families and their workplace. These compounds display differential dose-dependent effects, selectively targeting the $5-HT_{2A}$ receptor at low doses, while progressively interacting with the D2 receptor at higher doses. As a result, at lower doses, they are useful in treating sleep, aggression and agitation. At a high-dose, they can treat acute exacerbated and residual schizophrenia, bipolar disorders, and mood disorders.

Lumateperone, having the formula:

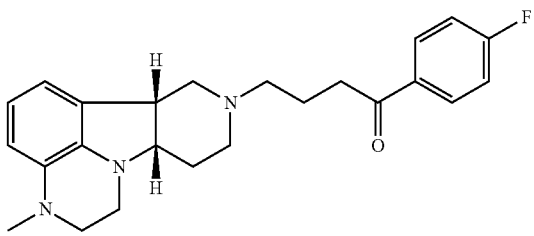 [SMILES: CN1CCN2c3c(cccc31)[C@@H]1CN(CCCC(=O)c3ccc(F)cc3)CC[C@@H]12]

is a novel therapeutic agent with potent (Ki=0.5 nM) 5-HT$_{2A}$ receptor antagonism, activity as a mesolimbic/mesocortical-selective dopamine receptor protein phosphorylation modulator consistent with presynaptic D2 receptor partial agonism and postsynaptic D2 receptor antagonism (Ki=32 nM) in vivo, high D1 receptor affinity (Ki=52 nM), and inhibition of the serotonin transporter (SERT) (Ki=26-62 nM, using different assays for SERT activity). Lumateperone has been approved by the U.S. Food & Drug Administration for the treatment of schizophrenia, and it is in Phase III clinical development as a treatment of bipolar depression and agitation in dementia, including Alzheimer's Disease.

In schizophrenic patients lumateperone has been found to significantly improve social functioning, positive and negative symptoms, as well as impaired cognition at a low striatal D2 receptor occupancy, similar to that of clozapine. Moreover, in schizophrenia with co-morbid depression, Lumateperone improves the depressive symptoms, still with placebo-level safety profile and no metabolic changes or extrapyramidal side effects.

Lumateperone also exhibits antidepressant-like effects in the social defeat model and reverses reductions in socialization and social withdrawal following chronic stress. Recent data show that Lumateperone alone uniquely activates both NMDA and AMPA receptor-induced currents in pyramidal cells in rat mPFC slices and increases phosphorylation of key proteins in the mTOR pathway, including protein kinase Akt and p70S6 kinase, supporting a ketamine-like mechanism of action of lumateperone in both MDD and TRD.

Lumateperone and related compounds have been disclosed in U.S. Pat. Nos. 6,548,493; 7,238,690; 6,552,017; 6,713,471; 7,071,186; 7,183,282; U.S. RE39,680, and U.S. RE39,679, as novel compounds useful for the treatment of disorders associated with 5-HT$_{2A}$ receptor modulation such as anxiety, depression, psychosis, schizophrenia, sleep disorders, sexual disorders, migraine, conditions associated with cephalic pain, and social phobias. U.S. Pat. Nos. 7,071,186 and 7,183,282 also disclose methods of making substituted heterocycle fused gamma-carbolines and uses of these gamma-carbolines as serotonin agonists and antagonists useful for the control and prevention of central nervous system disorders such as addictive behavior and sleep disorders. U.S. Pat. Nos. 8,598,119, 9,168,28, 9,616,061, 10,117,867, and US 2015/0080404, each incorporated herein by reference, disclose the use of specific substituted heterocycle fused gamma-carbolines for the treatment of a combination of psychosis and depressive disorders as well as sleep, depressive and/or mood disorders in patients with psychosis or Parkinson's disease and for the treatment or prophylaxis of disorders associated with dementia, particularly behavioral or mood disturbances such as agitation, irritation, aggressive/assaultive behavior, anger, physical or emotional outbursts and psychosis and sleep disorders associated with dementia. U.S. Pat. Nos. 9,956,117, and 10,322,134 specifically disclose methods of treating negative symptoms or residual symptoms of schizophrenia using such specific substituted heterocycle fused gamma-carbolines. WO 2019/178484 discloses the use of such compounds for the acute treatment of depression and anxiety. U.S. Pat. Nos. 8,648,077, 9,119,995 and 9,586,960, each incorporated herein by reference, disclose methods of preparing toluenesulfonic acid addition salt crystals of particular substituted heterocycle fused gamma-carbolines, e.g., toluenesulfonic acid addition salt of 4-((6bR,10aS)-3-methyl-2,3,6b,9,10,10a-hexahydro-1H-pyrido[3',4':4,5]pyrrolo[1,2,3-de]quinoxalin-8(7H)-yl)-1-(4-fluorophenyl)-1-butanone.

U.S. Pat. Nos. 8,993,572 and 9,371,324, each incorporated herein by reference, disclose prodrugs/metabolites of substituted heterocycle fused gamma-carboline for improved formulation, e.g., extended/controlled release formulation. This application discloses that heterocycle fused gamma-carboline N-substituted with a 4-fluorophenyl(4-hydroxy)butyl moiety are shown to have high selectivity for the serotonin transporter (SERT) relative to the heterocycle fused gamma-carboline containing 4-fluorophenylbutanone.

U.S. Pat. No. 8,598,119 teaches that selected substituted heterocycle fused gamma-carboline compounds have nanomolar affinity for the serotonin reuptake transporter (SERT) and so are selective serotonin reuptake inhibitors.

As disclosed in U.S. Pat. No. 10,077,267, US 2017/0183350, and US 2019/0231780, each incorporated herein by reference, deuterated forms of lumateperone and related compounds have been shown to have improved metabolic stability.

Thus, unique among APDs, fused heterocycle gamma carbolines, such as lumateperone, exhibit both dopamine receptor modulation and SSRI activity in a single compound and, like ketamine, enhance both NMDA and AMPA-induced currents in rat mPFC pyramidal neurons via activation of D1 receptors and increase phosphorylation of key proteins in the mTOR pathway, likely downstream of AMPA receptor activation. These compounds therefore may represent a new rapid acting antidepressant treatment for mood disorders. In more recent studies lumateperone has been shown to exhibit anti-inflammatory properties, but unlike other drugs (such as ketamine), it does not act directly on microglia cells.

Recently, the glutamate-nitric oxide (NO)-cyclic guanosine monophosphate (cGMP) pathway, has received increased interest as a target for novel antipsychotic drugs (APDs), since the pathway has been implicated in the pathogenesis of schizophrenia. In schizophrenic patients, reduced brain NO levels compared to healthy individuals have been found in cerebrospinal fluid. Postmortem studies have demonstrated that schizophrenic patients have significantly fewer NO synthase (NOS)-containing striatal interneurons.

NO is synthesized after N-methyl-D-aspartate receptor (NMDAR) activation and will diffuse and activate soluble guanylyl cyclase, which will subsequently produce cGMP. As brain NMDAR dysfunction has been solidly demonstrated in schizophrenia, this may clearly contribute to the reduced brain NO levels in the patients. Moreover, it has been shown that polymorphisms in the NOS1 gene are associated with schizophrenia, thus decreased NOS1 expression might increase the susceptibility to develop schizophrenia by contributing to the hippocampal hypoglutamatergic state.

Research shows that a single injection of the antihypertensive NO donor sodium nitroprusside (SNP) may induce a rapid (within 4 h) and sustained (several weeks) antipsychotic effect in young treatment-resistant schizophrenic patients on a stable antipsychotic medication. In an additional case study, also clozapine-refractory schizophrenic patients showed the same effect. Since clozapine is the only FDA approved antipsychotic drug for treatment resistant schizophrenia, these findings underline the clinical potential of SNP. Another double-blind study in healthy individuals showed that SNP reduced psychotomimetic symptoms induced by ketamine.

Previous preclinical behavioral studies have also suggested that SNP may possess antipsychotic potential. Thus, SNP administration in rats completely abolished phencyclidine (PCP) induced hyperactivity. Moreover, a single dose of SNP was found to prevent ketamine induced hyperactivity up to a week after the SNP injection and also restored memory deficits caused by ketamine in the novel object recognition test.

Using whole cell patch clamp recording, it has been shown that a single intraperitoneal (i.p.) injection of SNP (3 mg/kg) causes both rapid and persisting changes in brain synaptic plasticity, including enhanced excitatory postsynaptic current responses and spine morphology in layer V pyramidal cells in rat medial prefrontal cortex (mPFC) brain slices.

Recently, we studied the antipsychotic-like effect of SNP in rats using behavioral and biochemical techniques, both when given alone and in combination with a sub-effective dose of risperidone. A low dose of SNP rapidly and potently augmented the antipsychotic-like effect of a sub-effective dose of risperidone in the conditioned avoidance response (CAR) test. Correlative biochemical studies of regional dopamine release in freely moving rats showed that SNP significantly enhances the risperidone-induced dopamine release in the mPFC, but not in the nucleus accumbens (NAc). Additionally, preliminary data of in vivo voltammetry experiments showed increases in NO responses in the NAc and PFC after SNP administration in rats, suggesting that increased NO signaling and increases in intracellular levels of cGMP may be involved in mediating the antipsychotic activity of SNP in rats. Interestingly, a proinflammatory immune state (increased markers of cellular immunity) is regularly found in schizophrenia, e.g., increased levels of cytokines such as IL-6.

There remains a need for improved treatments for schizophrenia, depression, anxiety, and other central nervous system disorders, especially in treatment-resistant patients.

BRIEF SUMMARY OF THE INVENTION

We have surprisingly found that substituted heterocycle fused gamma-carbolines as described herein, particularly lumateperone, exhibit an unexpected synergistic improvement in effectiveness when combined with nitric oxide donors such as SNP.

The present disclosure thus provides a method for treatment of psychosis (such as schizophrenia), depression (such as bipolar depression), and/or anxiety, or other CNS disorders for which lumateperone has been shown to be effective, comprising administering (i) an effective amount of a 5-$HT_{2A}$ or 5-$HT_{2A}$/D2 receptor ligand, for example a substituted heterocycle fused gamma-carboline as described herein, in free, pharmaceutically acceptable salt or prodrug form, and (ii) an effective amount of a nitric oxide donor, for example SNP, separately (sequentially or simultaneously), or in combination (e.g., in a fixed dose combination). The invention further provides a pharmaceutical composition, e.g., for use in such a method, comprising (i) a 5-$HT_{2A}$ or 5-$HT_{2A}$/D2 receptor ligand and (ii) a nitric oxide donor.

In some embodiments, the present disclosure provides the above methods, wherein such methods further comprise the concurrent administration of a PDE1 inhibitor, for example, the compounds of Formula II, as disclosed herein. Such compounds are disclosed in, for example, U.S. Pat. No. 9,545,406, the contents of which is hereby incorporated by reference in its entirety, as having utility in the treatment of central nervous system diseases, disorders and injuries, and as neuroprotective and/or neural regenerative agents.

DETAILED DESCRIPTION

Figure 1:
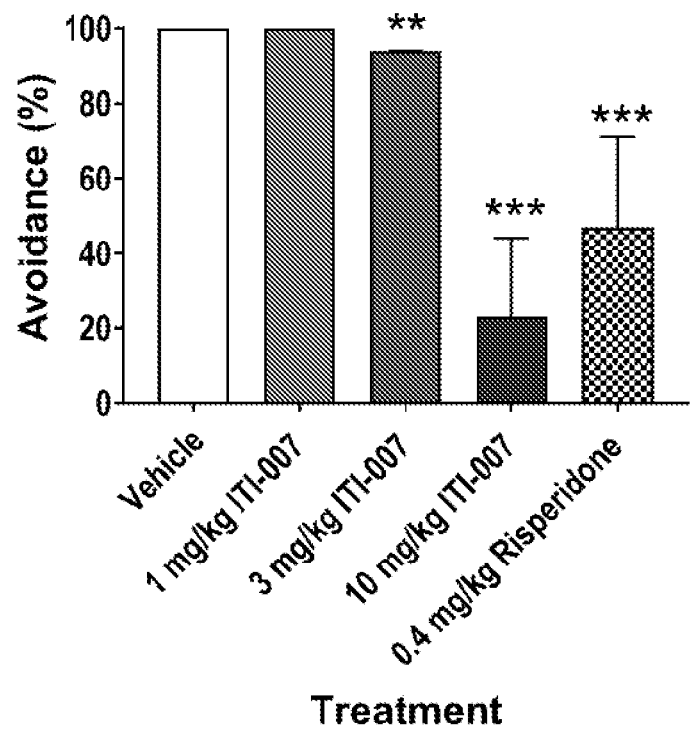
FIG. 1. Conditioned avoidance response (CAR) in male Wister rats 20 minutes after treatment with vehicle, lumateperone (1 mg/kg, 3 mg/kg or 10 mg/kg) or risperidone (0.4 mg/kg).  $p<0.01$ compared to vehicle+saline; * $p<0.001$ compared to vehicle+saline; n=11.

The 5-$HT_{2A}$ or 5-$HT_{2A}$/D2 receptor ligand is a compound which antagonizes serotonin-2A (5-$HT_{2A}$) receptor, and/or modulates dopamine receptor signaling at the level of key intra-cellular phosphoproteins and therefore is useful for the treatment of not only acute symptoms, but also residual symptoms of psychosis, particularly schizophrenia. At dopamine D2 receptors, these compounds have dual properties and act as both post-synaptic antagonists and pre-synaptic partial agonists. They also stimulate phosphorylation of glutamatergic NMDA NR2B, or GluN2B, receptors in a mesolimbic specific manner. It is believed that this regional selectivity in the brain areas thought to mediate the efficacy of antipsychotic drugs, together with serotonergic, glutamatergic, and dopaminergic interactions, may result in antipsychotic efficacy for positive, negative, affective and cognitive symptoms associated with schizophrenia. The compounds also exhibit serotonin reuptake inhibition, providing antidepressant activity for the treatment of schizoaffective disorder, co-morbid depression, and/or as a stand-alone treatment for major depressive disorder. The 5-$HT_{2A}$ or 5-$HT_{2A}$/D2 receptor ligands as described are also useful for the treatment of bipolar disorder and other psychiatric and neurodegenerative disorders, particularly behavioral disturbances associated with dementia, autism and other CNS diseases.

Lumateperone is a novel therapeutic agent with potent (Ki=0.5 nM) binding to the 5-$HT_{2A}$ receptor and moderate binding to the D1 and D2 receptors and the SERT transporter. Functionally, such binding can generally result in either agonist activity, partial agonist activity, or antagonist activity. Lumateperone has been found to exhibit potent antagonist activity at the 5-HT$_{2A}$ receptor and SERT, and mixed agonist/antagonist activity at the D$_1$ and D$_2$ receptors (depending on cell type). In particular, lumateperone shows activity as a mesolimbic/mesocortical-selective dopamine receptor protein phosphorylation modulator consistent with presynaptic D2 receptor partial agonism and postsynaptic D2 receptor antagonism (Ki=32 nM) in vivo, with high D1 receptor affinity (Ki=52 nM), and inhibition of serotonin transporter activity (SERT) (Ki=26-62 nM, using different assays for SERT activity). Lumateperone is in Phase III clinical development as a treatment for schizophrenia, bipolar depression and agitation in dementia, including Alzheimer's Disease.

In a particular embodiment, the present disclosure provides a method (Method 1) for the treatment of psychosis (such as schizophrenia), depression (such as bipolar depression), and/or anxiety, or other CNS disorders for which lumateperone has been shown to be effective, comprising administering (i) an effective amount of a 5-HT$_{2A}$ or 5-HT$_{2A}$/D2 receptor ligand, for example a substituted heterocycle fused gamma-carboline as described herein, in free, pharmaceutically acceptable salt or prodrug form, and (ii) an effective amount of a nitric oxide donor, for example SNP, separately (sequentially or simultaneously), or in combination (e.g., in a fixed dose combination). For example, Method 1 may be as follows:

1.1. Method 1, wherein the 5-HT$_{2A}$ or 5-HT$_{2A}$/D2 receptor ligand is a substituted heterocycle fused gamma-carboline compound according to Formula I:

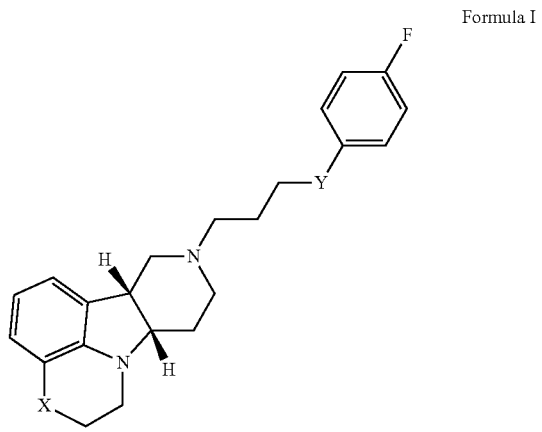

Formula I wherein:
X is —N(H)—, —N(CH$_3$)— or —O—;
Y is —C(=O)—, —C(H)(OH)— or —C(H)(OR$_1$)—;
R$_1$ is —C(O)—C$_{1-21}$alkyl or —C(O)O—C$_{1-21}$alkyl;
optionally in deuterated form,
in free, pharmaceutically acceptable salt or prodrug form;

1.2. Method 1 or 1.1, wherein X in the compound of Formula I is —N(H);
1.3. Method 1 or 1.1, wherein X in the compound of Formula I is —N(CH$_3$)—;
1.4. Method 1 or 1.1, wherein X in the compound of Formula I is —O—;
1.5. Method 1 or any of formulae 1.1-1.4, wherein Y in the compound of Formula I is —C(=O)—;
1.6. Method 1 or any of formulae 1.1-1.4, wherein Y in the compound of Formula I is —C(H)(OH)—;
1.7. Method 1 or any of formulae 1.1-1.4, wherein Y in the compound of Formula I is —C(H)(OR$_1$)—;
1.8. Method 1.7, wherein R$_1$ in the compound of Formula I is —C(O)—C$_{1-21}$alkyl (e.g., —C(O)—C$_{1-5}$alkyl, —C(O)—C$_{6-15}$alkyl or —C(O)—C$_{16-21}$alkyl), preferably said alkyl is a straight chain, optionally saturated or unsaturated and optionally substituted with one or more hydroxy or C$_{1-22}$ alkoxy (e.g., ethoxy) groups, for example R$_1$ is —C(O)—C$_6$alkyl, —C(O)—C$_7$alkyl, —C(O)—C$_9$alkyl, —C(O)—C$_{11}$alkyl, —C(O)—C$_{13}$alkyl or —C(O)—C$_{15}$alkyl wherein such compound hydrolyzes to form the residue of a natural or unnatural, saturated or unsaturated fatty acid, e.g., the compound hydrolyzes to form the hydroxy compound on the one hand and octanoic acid, decanoic acid, dodecanoic acid, tetradecanoic acid or hexadecanoic acid on the other hand); e.g., wherein R$_1$ in the compound of Formula I is —C(O)—C$_{6-15}$alkyl, e.g., —C(O)—C$_9$alkyl; or wherein R$_1$ in the compound of Formula I is —C(O)—C$_{1-5}$alkyl, e.g., —C(O)—C$_3$alkyl;
1.9. Method 1.7, wherein R$_1$ in the compound of Formula I is —C(O)O—C$_{1-21}$alkyl (e.g., —C(O)O—C$_{1-5}$alkyl, —C(O)O—C$_{6-15}$ alkyl or —C(O)O—C$_{16-21}$alkyl), preferably said alkyl is a straight chain, optionally saturated or unsaturated and optionally substituted with one or more hydroxy or C$_{1-22}$ alkoxy (e.g., ethoxy) groups, for example R$_1$ is —C(O)O—C$_6$alkyl, —C(O)O—C$_7$alkyl, —C(O)O—C$_9$alkyl, —C(O)O—C$_{11}$alkyl, —C(O)O—C$_{13}$alkyl or —C(O)O—C$_{15}$alkyl wherein such compound hydrolyzes to form the residue of a natural or unnatural, saturated or unsaturated fatty acid, e.g., the compound hydrolyzes to form the hydroxy compound on the one hand and octanoic acid, decanoic acid, dodecanoic acid, tetradecanoic acid or hexadecanoic acid on the other hand); e.g., wherein R$_1$ in the compound of Formula I is —C(O)O—C$_{6-15}$ alkyl, e.g., —C(O)O—C$_9$alkyl; or wherein R$_1$ in the compound of Formula I is —C(O)O—C$_{1-5}$alkyl, e.g., —C(O)O—C$_3$alkyl;
1.10. Method 1 or any of 1.1-1.4 or 1.6, wherein the Compound of Formula I is:

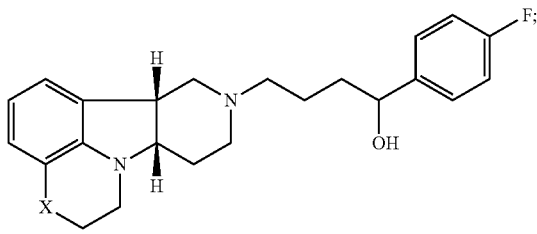

1.11. Method 1 or any of 1.1-1.4 or 1.6, wherein the Compound of Formula I is:

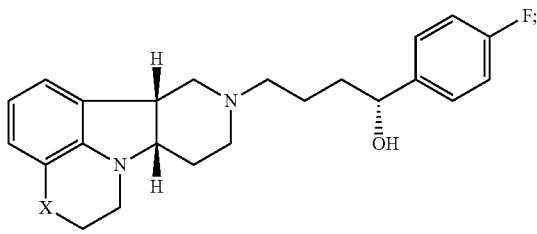

1.12. Any foregoing Method 1, 1.3, or 1.5, wherein the Compound of Formula I is:

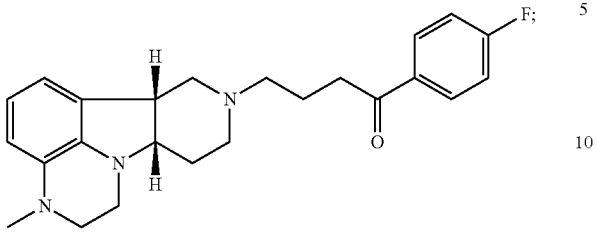

1.13. Method 1, or any of 1.1-1.12 wherein the Compound of Formula I is in the form of a toluenesulfonic acid addition salt (such as a mono-tosylate salt or bistosylate salt), optionally in the form of a crystalline salt;

1.14. Method 1, or any of 1.1-1.12, wherein the Compound of Formula I is in the form of the free base;

1.15. Method 1 or any of 1.1-1.14 wherein the Compound of Formula I is in deuterated form, e.g., wherein the deuterium:protium ratio for a specified carbon-bound hydrogen atom is significantly higher, e.g., at least 2×, for example at least 10× higher, than the natural isotope ratios;

1.16. Method 1.15 wherein the Compound of Formula I is selected from

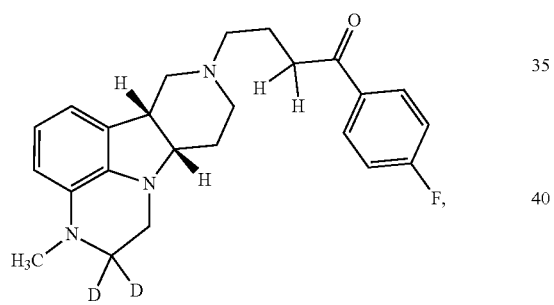

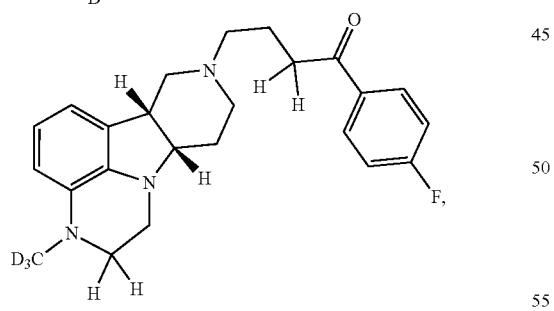

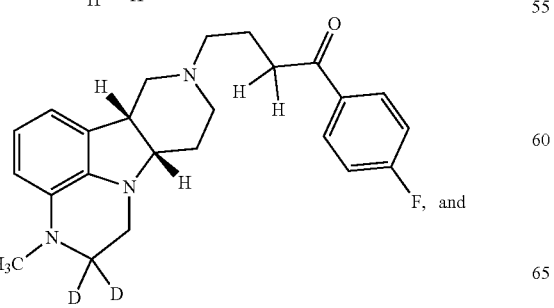

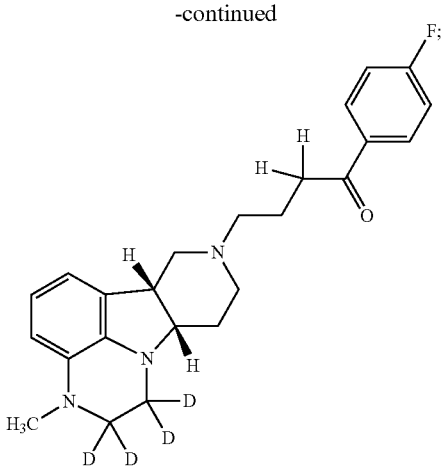

wherein D represents a hydrogen position with substantially greater than natural deuterium incorporation (i.e., substantially greater than 0.0156%), e.g., greater than 60%, or greater than 70%, or greater than 80%, or greater than 90% or greater than 95%, or greater than 96%, or greater than 97%, or greater than 98%, or greater than 99%, in free or pharmaceutically acceptable salt form, e.g. toluene sulfonic acid addition salt form;

1.17. Any foregoing method, wherein the 5-HT$_{2A}$ or 5-HT$_{2A}$/D2 receptor ligand is a compound of Formula I, wherein X is —N(CH$_3$)— and Y is —C(=O)—, in the form of a toluenesulfonic acid addition salt (e.g., a monotosylate salt, ditosylate salt, or combination thereof);

1.18. Method 1.17, wherein the compound of Formula I is administered in a daily dose equivalent to about 1 to 100 mg of the monotosylate salt, e.g., 1 to 75 mg, or 1 to 60 mg, or 1 to 40 mg, or 1 to 30, or 1 to 20 mg, or 1 to 10 mg, or 1 to 5 mg, of the monotosylate salt;

1.19. Method 1.17 wherein the method comprises once daily administration of a unit dosage for oral administration, for example a tablet or capsule, comprising the compound of Formula I in an amount equivalent 1 to 100 mg of the monotosylate salt, e.g., 1 to 75 mg, or 1 to 60 mg, or 1 to 40 mg, or 1 to 30 mg, or 1 to 20 mg, or 1 to 10 mg, or 1 to 5 mg, of the monotosylate salt, and a pharmaceutically acceptable diluent or carrier;

1.20. Method 1.17 wherein the method comprises once daily administration of a unit dosage form for subcutaneous or transmucosal administration, e.g., a sublingual or buccal orally disintegrating tablet or film, comprising the compound of Formula I in an amount equivalent 1 to 100 mg of the monotosylate salt, e.g., 1 to 75 mg, or 1 to 60 mg, or 1 to 40 mg, or 1 to 30 mg, or 1 to 20 mg, or 1 to 10 mg, or 1 to 5 mg, of the monotosylate salt, and a pharmaceutically acceptable diluent or carrier;

1.21. Method 1 or any of 1.1-1.20, wherein the nitric oxide donor is a nitrate ester compound (—O—NO$_2$) or nitrite ester compound (—O—NO);

1.22. Method 1 or any of 1.1-1.20, wherein the nitric oxide donor is an N-nitroso compound (—N—NO), an S-nitroso compound (—S—NO), a diazeniumdiolate compound (—N—(NO)=(NO) or —N—N(O)—N=O), or a furoxan compound;

1.23. Method 1 or any of 1.1-1.22, wherein the nitric oxide donor is a compound which yields nitric oxide upon in vivo enzymatic action (e.g., biotransformation), such as by denitration and/or reduction;
1.24. Method 1 or any of 1.1-1.22, wherein the nitric oxide donor is a compound which yields nitric oxide in vivo without enzymatic action (e.g., biotransformation), such as by hydrolysis and/or spontaneous decomposition), for example, N-nitroso compounds or precursors thereof;
1.25. Method 1 or any of 1.1-1.24, wherein the nitric oxide donor is a prodrug of a nitrate ester (e.g., a compound which upon in vivo hydrolysis or enzymatic action releases a nitrate ester compound);
1.26. Method 1 or any of 1.1-1.24, wherein the nitric oxide donor is selected from sodium nitroprusside (SNP), nitroglycerin (glyceryl trinitrate or GTN), amyl nitrate, diethylene glycol dinitrate, isosorbide mononitrate (ISMN), isosorbide dinitrate (ISDN), itramin tosylate, pentaerythritol tetranitrate (PETN), propatyl nitrate, sinitrodil, tenitramine, trolnitrate, molsidomine, linsidomine, naproxcinod, amyl nitrite, diethylamine diazeniumdiolate (DEA/NO), diethyltriamine diazeniumdiolate (DETA/NO), spermine diazeniumdiolate (SPER/NO), proline diazeniumdiolate (PROLI/NO), dipropyltriamine diazeniumdiolate (DPTA/NO), methylamine hexamethylene methylamine diazeniumdiolate (MAHMA/NO), propylamine propylamine diazeniumdiolate (PAPA/NO or NOC-15), isopropylamine propylamine diazeniumdiolate (IPAPA/NO or NOC-5), isopropylamine diazeniumdiolate (IPA/NO), heparin diazeniumdiolate, pyrrolidine diazeniumdiolate (PYRRO/NO), $O^2$-vinyl-1-(pyrrolidin-1-yl)diazen-1-ium-1,2-diolate (V-PYRRO/NO), $O^2$-vinyl-1-isopropyl-diazen-1-ium-1,2-diolate (V-IPA/NO), $O^2$-vinyl-[2-(carboxylato)pyrrolidin-1-yl]diazen-1-ium-1,2-diolate (V-PROLI/NO), $O^2$-(2,4-dinitrophenyl)-1-[(4-ethoxycarbonyl)piperazin-1-yl]diazen-1-ium-1,2-diolate (JS-K), $O^2$-vinyl-1-[(4-ethoxycarbonyl)piperazin-1-yl]diazen-1-ium-1,2-diolate, $O^2$-acetoxymethyl-isopropyldiazen-1-ium-1,2-diolate (AcOM-IPA/NO), S-nitrosoglutathione (GSNO), S-nitroso-N-acetylpenicillamine (SNAP), S-nitroso-N-valerylpenicillamine (SNVP), S-nitroso-N-acetylcysteine (SNAC), S-nitrosoalbumin, and NO hybrid drugs (e.g., 2-(acetyloxy)-benzoic acid 3-[(nitrooxy)methyl] phenyl ester (NCX4016), 5-nitrooxypentyl 2-acetyloxybenzoate (NCX4215), nicorandil (2-nicotinamidoethyl nitrate), nipradilol (K-351), NO-pravastatin, NO-fluvastatin, NO-losartan, NO-indomethacin, NO-ibuprofen, NO-sulindac, NO-naproxen, S-nitroso-diclofenac, S-nitroso-captopril);
1.27. Any foregoing method, further comprising administration of an agent which stimulates the nitric oxide signaling pathway, for example, by stimulating the production of or inhibiting the degradation of cyclic guanosine monophosphate (cGMP);
1.28. Method 1.27, wherein said agent is a phosphodiesterase (PDE) inhibitor, e.g., a PDE1 and/or PDE5 inhibitor, preferably an PDE inhibitor which crosses the blood-brain barrier (e.g., ITI-214);
1.29. Any foregoing method wherein the condition to be treated is psychosis, such as schizophrenia (e.g., prodromal, acute and/or residual symptoms of psychosis; or negative and/or positive symptoms of psychosis), delusional disorder (e.g., somatic type), major depression with psychosis, bipolar disorder with psychotic symptoms, brief psychotic disorder, schizophreniform disorder, schizoaffective disorder, or psychosis caused by a medical condition or substance use;
1.30. Method 1.29, wherein the condition to be treated is symptoms (e.g., residual phase symptoms) of psychosis (e.g., schizophrenia) selected from: (1) negative symptoms, such as blunted affect, emotional withdrawal, poor rapport, passive or apathetic social withdrawal, difficulty in abstract thinking, lack of spontaneity and flow of conversation and stereotyped thinking; and (2) general psychopathology symptoms, such as somatic concern, anxiety, guilt feelings, tension, mannerisms and posturing, depression, motor retardation, uncooperativeness, unusual thought content, disorientation, poor attention, lack of judgment and insight, disturbance of volition, poor impulse control, preoccupation and active social avoidance; cognitive impairment and sleep disorders (e.g., insomnia);
1.31. Method 1.29, wherein the condition is be treated is symptoms (e.g., prodromal phase symptoms) of psychosis (e.g., schizophrenia) selected from loss of interest in usual pursuits, withdrawal from friends and family members, confusion, trouble with concentration, feeling of listless and apathy;
1.32. Method 1.29, wherein the condition is be treated is symptoms (e.g., active or acute phase symptoms) of psychosis (e.g., schizophrenia) selected from positive symptoms such as delusions, hallucinations and suspiciousness;
1.33. Method 1.29-1.32, wherein the psychosis (e.g., schizophrenia) is treatment-resistant psychosis (e.g., treatment-resistant schizophrenia), for example, psychosis (or schizophrenia) which has not responded to treatment with one or more antipsychotic agents;
1.34. Method 1.33, wherein the one or more antipsychotic agents are selected from typical antipsychotics (first generation), atypical antipsychotics (second generation);
1.35. Method 1.33 or 1.34 wherein the one or more antipsychotics are selected from acepromazine, amisulpride, aripiprazole, asenapine, benperidol blonanserin, brexipiprazole, bromperidol, cariprazine, cariprazine, carpipramine, chlorpromazine, chlorprothixene, clocapramine, clopenthixol, clorotepine, clotiapine, clozapine, cyamemazine, dixyrazine, droperidol, flupentixol, fluphenazine, fluspirilene, haloperidol, iloperidone, levomepromazine, loxapine, lurasidone, melperone, mesoridazine, molindone, perphenazine, moperone, mosapramine, nemonapride, olanzapine, paliperidone, penfluridol, perazine, periciazine, perospirone, pimavanserin, pimozide, pipamperone, pipotiazine, prochlorperazine, proniazine, prothipendyl, quetiapine, remoxipride, risperidone, sertindole, sulpiride, sultopride, thioproperazine, thioridazine, thiothixene, timiperone, trifluoperazine, triflupromazine, veralipride, ziprasidone, zotepine, and zuclopenthixol;
1.36. Any foregoing method wherein the condition to be treated is anxiety, such as acute anxiety (e.g., a short-duration anxious episode associated with generalized anxiety disorder, panic disorder, specific phobias, or social anxiety disorder, or social avoidance);
1.37. Any foregoing method wherein the condition to be treated is depression, such as acute depression (e.g., acute major depressive episode, acute short-duration depressive episode, acute recurrent brief depressive episode);

1.38. Any foregoing method wherein the condition to be treated is treatment resistant depression, for example depression which has not responded to treatment with one or more antidepressant agents;

1.39. Method 1.38, wherein the one or more anti-depressant agents are selected from a selective serotonin reuptake inhibitor (SSRI), a serotonin reuptake inhibitor (SRI), a tricyclic antidepressant, a monoamine oxidase inhibitor, a norepinephrine reuptake inhibitor (NRI), a dopamine reuptake inhibitor (DRI), an SRI/NRI, an SRI/DRI, an NRI/DRI, an SRI/NRI/DRI (triple reuptake inhibitor), a serotonin receptor antagonist, or any combination thereof);

1.40. Method 1.38, wherein the one or more anti-depressant agents are selected from citalopram, escitalopram, paroxetine, fluoxetine, fluvoxamine, sertraline, venlafaxine, desvenlafaxine, duloxetine, levomilnacipran, milnacipran, vilazodone, vortioxetine, nefazodone, trazodone, atomoxetine, reboxetine, teniloxazine, viloxazine, bupropion, tofenacin, amitriptyline, amitriptyline N-oxide, clomipramine, desipramine, dibenzepin, dimetacrine, dosulepin, doxepin, imipramine, lofepramine, melitracen, nitroxazepine, nortriptyline, noxiptiline, opipramol, pipofezine, protriptyline, trimipramine, amoxapine, maprotiline, mirtazapine, mianserin, and setiptiline;

1.41. Any foregoing method wherein the condition to be treated is selected from bipolar depression and major depressive disorder;

1.42. Any foregoing method wherein the 5-$HT_{2A}$ or 5-$HT_{2A}$/D2 receptor ligand and the nitric oxide donor are provided in a fixed combination unit dosage form;

1.43. Method 1 or any of 1.1-1.41, wherein the 5-$HT_{2A}$ or 5-$HT_{2A}$/D2 receptor ligand and the nitric oxide donor are provided in separate pharmaceutical compositions administered simultaneously or sequentially (e.g., within a 24-hour period);

1.44. Any foregoing method, wherein the patient has not responded to, or has not responded adequately to, or who suffers undesirable side effects from, treatment with another anti-psychotic agent or anti-depressant agent, as defined herein;

1.45. Any foregoing method, wherein the 5-$HT_{2A}$ or 5-$HT_{2A}$/D2 receptor ligand has an $IC_{50}$ of less than 250 nM or an $EC_{50}$ of less than 250 nM for activity (agonism and/or antagonism) at the 5-$HT_{2A}$ receptor, e.g., an $IC_{50}$ or $EC_{50}$ of less than 200 nM, or less than 150 nM, or less than 100 nM, or less than 75 nM, or less than 60 nM, or less than 50 nM, or less than 40 nM, or less than 30 nM, or less than 20 nM, for activity at said receptor (agonism or antagonism);

1.46. Any foregoing method, wherein the 5-$HT_{2A}$ or 5-$HT_{2A}$/D2 receptor ligand has an $IC_{50}$ of less than 250 nM or an $EC_{50}$ of less than 250 nM for activity (agonism and/or antagonism) at the D2 receptor, e.g., an $IC_{50}$ or $EC_{50}$ of less than 200 nM, or less than 150 nM, or less than 100 nM, or less than 75 nM, or less than 60 nM, or less than 50 nM, or less than 40 nM, or less than 30 nM, or less than 20 nM, for activity at said receptor (agonism or antagonism);

1.47. Any foregoing method, wherein the 5-$HT_{2A}$ or 5-$HT_{2A}$/D2 receptor ligand has an $IC_{50}$ of less than 250 nM or an $EC_{50}$ of less than 250 nM for activity (agonism and/or antagonism) at the D1 receptor, e.g., an $IC_{50}$ or $EC_{50}$ of less than 200 nM, or less than 150 nM, or less than 100 nM, or less than 75 nM, or less than 60 nM, or less than 50 nM, or less than 40 nM, or less than 30 nM, or less than 20 nM, for activity at said receptor (agonism or antagonism);

1.48. Any foregoing method, wherein the 5-$HT_{2A}$ or 5-$HT_{2A}$/D2 receptor ligand has an $IC_{50}$ of less than 250 nM or an $EC_{50}$ of less than 250 nM for activity (agonism and/or antagonism) at the serotonin transporter (SERT), e.g., an $IC_{50}$ or $EC_{50}$ of less than 200 nM, or less than 150 nM, or less than 100 nM, or less than 75 nM, or less than 60 nM, or less than 50 nM, or less than 40 nM, or less than 30 nM, or less than 20 nM, for activity at said transporter (agonism or antagonism);

1.49. Any foregoing method, wherein the 5-$HT_{2A}$ or 5-$HT_{2A}$/D2 receptor ligand and/or the nitric oxide donor is administered in the form of a long-acting injectable (LAI) composition, e.g., for intramuscular or subcutaneous injection;

1.50. Method 1.49, wherein the 5-$HT_{2A}$ or 5-$HT_{2A}$/D2 receptor ligand is a Compound of Formula I and the LAI composition comprises said Compound in an amount sufficient to provide the equivalent of a daily dose of 1 to 100 mg of free base, e.g., 1 to 75 mg, or 1 to 60 mg, or 1 to 40 mg, or 1 to 20 mg, or 1 to 10 mg, of free base, released over a period of time ranging from about 1 week to about 3 months, e.g., about 1 week to about 8 weeks, or about 1 week to about 6 weeks, or about 1 week to about 4 weeks, or about 1 week to about 3 weeks, or about 1 week to about 2 weeks;

1.51. Method 1.50, wherein the LAI composition comprises the compound of Formula I dissolved, dispersed, suspended, or encapsulated in a polymeric matrix;

1.52. Method 1.51, wherein the polymeric matrix comprises one or more biocompatible and biodegradable polymers as defined herein, e.g., poly(hydroxycarboxylic acids), poly(amino acids), cellulose polymers, modified cellulose polymers, polyamides, and polyesters;

1.53. Method 1.52, wherein the one or more polymers comprises poly(lactic acid), poly(glycolic acid), poly (citric acid), poly(malic acid), poly(beta-hydroxybutyric acid), poly(lactic acid-glycolic acid) copolymer, 2-hydroxybutyric acid-glycolic acid copolymer, polylactic acid-polyethylene glycol copolymer, polyglycolic acid-polyethylene glycol copolymer, poly (alkyl alpha-cyanoacrylate) such as poly(butyl cyanoacrylate) or poly(2-octyl cyanoacrylate), poly(ortho ester), polycarbonate, polyortho-carbonate, a polyamino acid, (for example poly-gamma.-L-alanine, poly-.gamma.-benzyl-L-glutamic acid or poly-y-methyl-L-glutamic acid), and/or hyaluronic acid ester;

1.54. Method 1.53, wherein the one or more polymers comprises polylactic acid, polyglycolic acid, poly(citric acid), poly(malic acid), or a poly(lactic acid-glycolic acid) copolymer;

1.55. Method 1.53, wherein the one or more polymers comprises a poly(lactic acid-glycolic acid) copolymer, e.g., poly-d,l-lactide-co-glycolide;

1.56. Any foregoing method, wherein the 5-$HT_{2A}$ or 5-$HT_{2A}$/D2 receptor ligand and nitric oxide donor are not administered concurrently or in conjunction with an anti-depressant, anti-psychotic, or anti-anxiety agent.

In another aspect, the disclosure provides a 5-$HT_{2A}$ or 5-$HT_{2A}$/D2 receptor ligand, e.g., a compound of Formula I, as hereinbefore described, for example lumateperone, in free or salt form, optionally in deuterated form, in combination with a nitric oxide donor, for example SNP, for use in the treatment of psychosis, depression and/or anxiety, e.g., for use in any of Methods 1, et seq.

In another aspect, the disclosure provides the use of a 5-HT$_{2A}$ or 5-HT$_{2A}$/D2 receptor ligand, e.g. a compound of Formula I, as hereinbefore described, for example lumateperone, in free or salt form, optionally in deuterated form, in combination with a nitric oxide donor, for example SNP, for use in the manufacture of a medicament for the treatment of psychosis, depression and/or anxiety, e.g., for any of Methods 1, et seq.

In another aspect, the invention provides a pharmaceutical composition (Composition 1), e.g., for the treatment of psychosis, depression and/or anxiety, e.g., for any of Methods 1, et seq., comprising (i) an effective amount of a 5-HT$_{2A}$ or 5-HT$_{2A}$/D2 receptor ligand, for example a substituted heterocycle fused gamma-carboline as described herein, in free, pharmaceutically acceptable salt or prodrug form, and (ii) an effective amount of a nitric oxide donor, for example SNP. For example, Composition 1 may be as follows:

1.1. Composition 1, wherein the 5-HT$_{2A}$ or 5-HT$_{2A}$/D2 receptor ligand is a substituted heterocycle fused gamma-carboline compound according to Formula I:

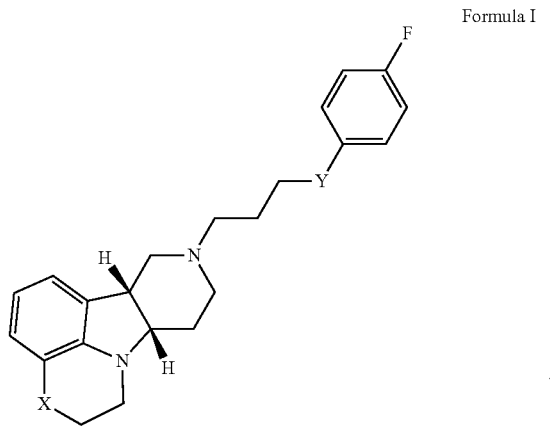

Formula I wherein:
X is —N(H)—, —N(CH$_3$)— or —O—;
Y is —C(=O)—, —C(H)(OH)— or —C(H)(OR$_1$)—;
R$_1$ is —C(O)—C$_{1-21}$ alkyl or —C(O)O—C$_{1-21}$alkyl;
optionally in deuterated form,
in free, pharmaceutically acceptable salt or prodrug form.

1.2. Composition 1 or 1.1, wherein X in the compound of Formula I is —N(H);

1.3. Composition 1 or 1.1, wherein X in the compound of Formula I is —N(CH$_3$)—;

1.4. Composition 1 or 1.1, wherein X in the compound of Formula I is —O—;

1.5. Composition 1 or any of formulae 1.1-1.4, wherein Y in the compound of Formula I is —C(=O)—;

1.6. Composition 1 or any of formulae 1.1-1.4, wherein Y in the compound of Formula I is —C(H)(OH)—;

1.7. Composition 1 or any of formulae 1.1-1.4, wherein Y in the compound of Formula I is —C(H)(OR$_1$)—;

1.8. Composition 1.7, wherein R$_1$ in the compound of Formula I is —C(O)—C$_{1-21}$alkyl (e.g., —C(O)—C$_{1-5}$alkyl, —C(O)—C$_{6-15}$ alkyl or —C(O)—C$_{16-21}$alkyl), preferably said alkyl is a straight chain, optionally saturated or unsaturated and optionally substituted with one or more hydroxy or C$_{1-22}$ alkoxy (e.g., ethoxy) groups, for example R$_1$ is —C(O)—C$_6$alkyl, —C(O)—C$_7$alkyl, —C(O)—C$_9$alkyl, —C(O)—C$_{11}$alkyl, —C(O)—C$_{13}$alkyl or —C(O)—C$_{15}$alkyl wherein such compound hydrolyzes to form the residue of a natural or unnatural, saturated or unsaturated fatty acid, e.g., the compound hydrolyzes to form the hydroxy compound on the one hand and octanoic acid, decanoic acid, dodecanoic acid, tetradecanoic acid or hexadecanoic acid on the other hand); e.g., wherein R$_1$ in the compound of Formula I is —C(O)—C$_{6-15}$ alkyl, e.g., —C(O)—C$_9$alkyl; or wherein R$_1$ in the compound of Formula I is —C(O)—C$_{1-5}$alkyl, e.g., —C(O)—C$_3$alkyl;

1.9. Composition 1.7, wherein R$_1$ in the compound of Formula I is —C(O)O—C$_{1-21}$ alkyl (e.g., —C(O)O—C$_{1-5}$alkyl, —C(O)O—C$_{6-15}$ alkyl or —C(O)O—C$_{16-21}$alkyl), preferably said alkyl is a straight chain, optionally saturated or unsaturated and optionally substituted with one or more hydroxy or C$_{1-22}$alkoxy (e.g., ethoxy) groups, for example R$_1$ is —C(O)O—C$_6$alkyl, —C(O)O—C$_7$alkyl, —C(O)O—C$_9$alkyl, —C(O)O—C$_{11}$alkyl, —C(O)O—C$_{13}$alkyl or —C(O)O—C$_{15}$alkyl wherein such compound hydrolyzes to form the residue of a natural or unnatural, saturated or unsaturated fatty acid, e.g., the compound hydrolyzes to form the hydroxy compound on the one hand and octanoic acid, decanoic acid, dodecanoic acid, tetradecanoic acid or hexadecanoic acid on the other hand); e.g., wherein R$_1$ in the compound of Formula I is —C(O)O—C$_{6-15}$ alkyl, e.g., —C(O)O—C$_9$alkyl; or wherein R$_1$ in the compound of Formula I is —C(O)O—C$_{1-5}$alkyl, e.g., —C(O)O—C$_3$alkyl;

1.10. Composition 1 or any of 1.1-1.4 or 1.6, wherein the Compound of Formula I is:

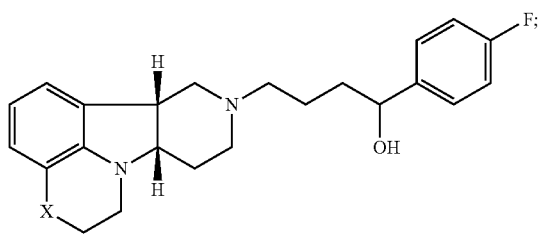

1.11. Composition 1 or any of 1.1-1.4 or 1.6, wherein the Compound of Formula I is:

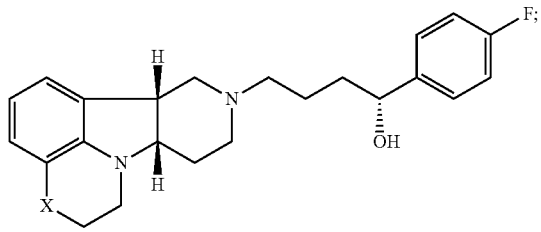

1.12. Composition 1, 1.3, or 1.5, wherein the Compound of Formula I is:

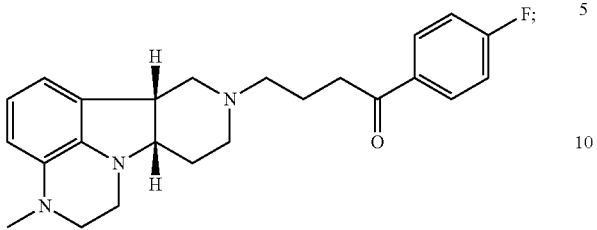

1.13. Composition 1, or any of 1.1-1.12 wherein the Compound of Formula I is in the form of a toluenesulfonic acid addition salt (e.g., a mono-tosylate or bis-tosylate salt), optionally in crystalline salt form;

1.14. Composition 1, or any of 1.1-1.12, wherein the Compound of Formula I is in the form of the free base;

1.15. Composition 1 or any of 1.1-1.14 wherein the Compound of Formula I is in deuterated form, e.g., wherein the deuterium:protium ratio for a specified carbon-bound hydrogen atom is significantly higher, e.g., at least 2×, for example at least 10× higher, than the natural isotope ratios;

1.16. Composition 1.15 wherein the Compound of Formula I is selected from

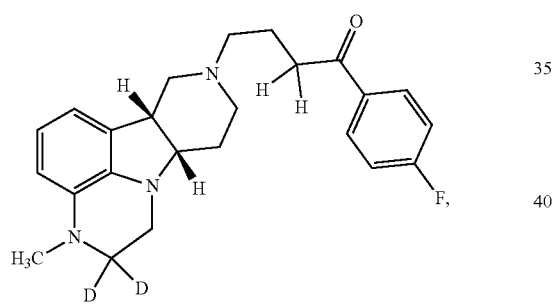

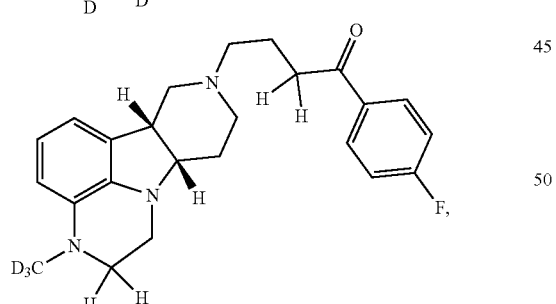

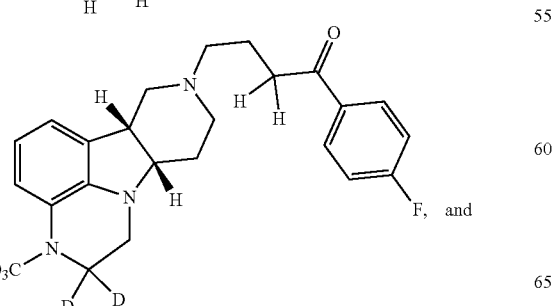

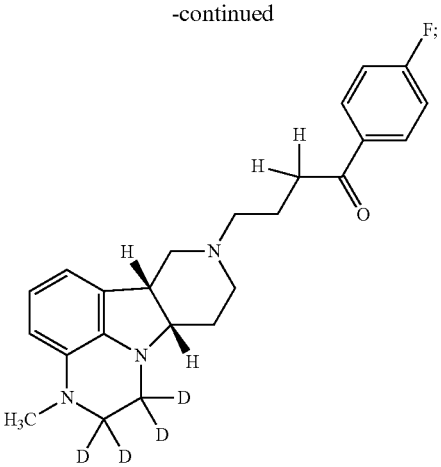

wherein D represents a hydrogen position with substantially greater than natural deuterium incorporation (i.e., substantially greater than 0.0156%), e.g., greater than 60%, or greater than 70%, or greater than 80%, or greater than 90% or greater than 95%, or greater than 96%, or greater than 97%, or greater than 98%, or greater than 99%, in free or pharmaceutically acceptable salt form, e.g. toluene sulfonic acid addition salt form;

1.17. Any foregoing Composition, wherein the 5-HT$_{2A}$ or 5-HT$_{2A}$/D2 receptor ligand is a compound of Formula I, wherein X is —N(CH$_3$)— and Y is —C(=O)—, in the form of a toluenesulfonic acid addition salt (e.g., a monotosylate salt, ditosylate salt, or combination thereof);

1.18. Composition 1.17, wherein the composition comprises the compound of Formula I in daily dose equivalent to about 1 to 100 mg of the monotosylate salt, e.g., 1 to 75 mg, or 1 to 60 mg, or 1 to 40 mg, or 1 to 30, or 1 to 20 mg, or 1 to 10 mg, or 1 to 5 mg, of the monotosylate salt;

1.19. Composition 1.17 wherein the Composition is a unit dosage for oral administration, for example a tablet or capsule, comprising the compound of Formula I in an amount equivalent 1 to 100 mg of the monotosylate salt, e.g., 1 to 75 mg, or 1 to 60 mg, or 1 to 40 mg, or 1 to 30 mg, or 1 to 20 mg, or 1 to 10 mg, or 1 to 5 mg, of the monotosylate salt, and a pharmaceutically acceptable diluent or carrier;

1.20. Composition 1.17 wherein the unit dosage form is formulated for subcutaneous or transmucosal administration, e.g., a sublingual or buccal orally disintegrating tablet or film, comprising the compound of Formula I in an amount equivalent 1 to 100 mg of the monotosylate salt, e.g., 1 to 75 mg, or 1 to 60 mg, or 1 to 40 mg, or 1 to 30 mg, or 1 to 20 mg, or 1 to 10 mg, or 1 to 5 mg, of the monotosylate salt, and a pharmaceutically acceptable diluent or carrier;

1.21. Composition 1 or any of 1.1-1.20, wherein the nitric oxide donor is a nitrate ester compound (—O—NO$_2$) or nitrite ester compound (—O—NO);

1.22. Composition 1 or any of 1.1-1.20, wherein the nitric oxide donor is an N-nitroso compound (—N—NO), an S-nitroso compound (—S—NO), a diazeniumdiolate compound (—N—(NO)=(NO) or —N—N(O)—N=O), or a furoxan compound;

1.23. Composition 1 or any of 1.1-1.22, wherein the nitric oxide donor is a compound which yields nitric oxide upon in vivo enzymatic action (e.g., biotransformation), such as by denitration and/or reduction;

1.24. Composition 1 or any of 1.1-1.22, wherein the nitric oxide donor is a compound which yields nitric oxide in vivo without enzymatic action (e.g., biotransformation), such as by hydrolysis and/or spontaneous decomposition), for example, N-nitroso compounds or precursors thereof;

1.25. Composition 1 or any of 1.1-1.24, wherein the nitric oxide donor is a prodrug of an alkyl nitrate (e.g., a compound which upon in vivo hydrolysis or enzymatic action releases an alkyl nitrate;

1.26. Composition 1 or any of 1.1-1.24, wherein the nitric oxide donor is selected from sodium nitroprusside (SNP), nitroglycerin (glyceryl trinitrate or GTN), amyl nitrate, diethylene glycol dinitrate, isosorbide mononitrate (ISMN), isosorbide dinitrate (ISDN), itramin tosylate, pentaerythritol tetranitrate (PETN), propatyl nitrate, sinitrodil, tenitramine, trolnitrate, molsidomine, linsidomine, naproxcinod, amyl nitrite, diethylamine diazeniumdiolate (DEA/NO), diethyltriamine diazeniumdiolate (DETA/NO), spermine diazeniumdiolate (SPER/NO), proline diazeniumdiolate (PROLI/NO), dipropyltriamine diazeniumdiolate (DPTA/NO), methylamine hexamethylene methylamine diazeniumdiolate (MAHMA/NO), propylamine propylamine diazeniumdiolate (PAPA/NO or NOC-15), isopropylamine propylamine diazeniumdiolate (IPAPA/NO or NOC-5), isopropylamine diazeniumdiolate (IPA/NO), heparin diazeniumdiolate, pyrrolidine diazeniumdiolate (PYRRO/NO), $O^2$-vinyl-1-(pyrrolidin-1-yl)diazen-1-ium-1,2-diolate (V-PYRRO/NO), $O^2$-vinyl-1-isopropyl-diazen-1-ium-1,2-diolate (V-IPA/NO), $O^2$-vinyl-[2-(carboxylato)pyrrolidin-1-yl]diazen-1-ium-1,2-diolate (V-PROLI/NO), $O^2$-(2,4-dinitrophenyl)-1-[(4-ethoxycarbonyl)piperazin-1-yl]diazen-1-ium-1,2-diolate (JS-K), $O^2$-vinyl-1-[(4-ethoxycarbonyl)piperazin-1-yl]diazen-1-ium-1,2-diolate, $O^2$-acetoxymethyl-isopropyldiazen-1-ium-1,2-diolate (AcOM-IPA/NO), S-nitrosoglutathione (GSNO), S-nitroso-N-acetylpenicillamine (SNAP), S-nitroso-N-valerylpenicillamine (SNVP), S-nitroso-N-acetylcysteine (SNAC), S-nitrosoalbumin, and NO hybrid drugs (e.g., 2-(acetyloxy)-benzoic acid 3-[(nitrooxy)methyl] phenyl ester (NCX4016), 5-nitrooxypentyl 2-acetyloxybenzoate (NCX4215), nicorandil (2-nicotinamidoethyl nitrate), nipradilol (K-351), NO-pravastatin, NO-fluvastatin, NO-losartan, NO-indomethacin, NO-ibuprofen, NO-sulindac, NO-naproxen, S-nitroso-diclofenac, S-nitroso-captopril).

1.27. Any foregoing Composition wherein the Composition is formulated for the treatment of psychosis, depression and/or anxiety, or other CNS disorders for which lumateperone has been shown to be effective;

1.28. Composition 1.27, wherein the condition to be treated is psychosis, such as schizophrenia (e.g., prodromal, acute and/or residual symptoms of psychosis; or negative and/or positive symptoms of psychosis), delusional disorder (e.g., somatic type), major depression with psychosis, bipolar disorder with psychotic symptoms, brief psychotic disorder, schizophreniform disorder, schizoaffective disorder or psychosis caused by a medical condition or substance use;

1.29. Composition 1.27, wherein the condition to be treated is symptoms (e.g., residual phase symptoms) of psychosis (e.g., schizophrenia) selected from: (1) negative symptoms, such as blunted affect, emotional withdrawal, poor rapport, passive or apathetic social withdrawal, difficulty in abstract thinking, lack of spontaneity and flow of conversation and stereotyped thinking; and (2) general psychopathology symptoms, such as somatic concern, anxiety, guilt feelings, tension, mannerisms and posturing, depression, motor retardation, uncooperativeness, unusual thought content, disorientation, poor attention, lack of judgment and insight, disturbance of volition, poor impulse control, preoccupation and active social avoidance; cognitive impairment and sleep disorders (e.g., insomnia).

1.30. Composition 1.27, wherein the condition is be treated is symptoms (e.g., prodromal phase symptoms) of psychosis (e.g., schizophrenia) selected from loss of interest in usual pursuits, withdrawal from friends and family members, confusion, trouble with concentration, feeling of listless and apathy.

1.31. Composition 1.27, wherein the condition is be treated is symptoms (e.g., active or acute phase symptoms) of psychosis (e.g., schizophrenia) selected from positive symptoms such as delusions, hallucinations and suspiciousness;

1.32. Composition 1.27-1.31, wherein the psychosis (e.g., schizophrenia) is treatment-resistant psychosis (e.g., treatment-resistant schizophrenia), for example, psychosis (or schizophrenia) which has not responded to treatment with one or more antipsychotic agents;

1.33. Composition 1.32, wherein the one or more antipsychotic agents are selected from typical antipsychotics (first generation), atypical antipsychotics (second generation);

1.34. Composition 1.32 or 1.33 wherein the one or more antipsychotics are selected from acepromazine, amisulpride, aripiprazole, asenapine, benperidol, blonanserin, brexipiprazole, bromperidol, cariprazine, cariprazine, carpipramine, chlorpromazine, chlorprothixene, clocapramine, clopenthixol, clorotepine, clotiapine, clozapine, cyamemazine, dixyrazine, droperidol, flupentixol, fluphenazine, fluspirilene, haloperidol, iloperidone, levomepromazine, loxapine, lurasidone, melperone, mesoridazine, molindone, perphenazine, moperone, mosapramine, nemonapride, olanzapine, paliperidone, penfluridol, perazine, periciazine, perospirone, pimavanserin, pimozide, pipamperone, pipotiazine, prochlorperazine, promazine, prothipendyl, quetiapine, remoxipride, risperidone, sertindole, sulpiride, sultopride, thioproperazine, thioridazine, thiothixene, timiperone, trifluoperazine, triflupromazine, veralipride, ziprasidone, zotepine, and zuclopenthixol;

1.35. Composition 1.27-1.34, wherein the condition to be treated is anxiety, such as acute anxiety (e.g., a short-duration anxious episode associated with generalized anxiety disorder, panic disorder, specific phobias, or social anxiety disorder, or social avoidance);

1.36. Composition 1.27-1.35, wherein the condition to be treated is depression, such as acute depression (e.g., acute major depressive episode, acute short-duration depressive episode, acute recurrent brief depressive episode);

1.37. Composition 1.27-1.36 wherein the condition to be treated is treatment resistant depression, for example depression which has not responded to treatment with one or more antidepressant agents;

1.38. Composition 1.37, wherein the one or more antidepressant agents are selected from a selective serotonin reuptake inhibitor (SSRI), a serotonin reuptake inhibitor (SRI), a tricyclic antidepressant, a monoamine oxidase inhibitor, a norepinephrine reuptake inhibitor (NRI), a dopamine reuptake inhibitor (DRI), an SRI/NRI, an SRI/DRI, an NRI/DRI, an SRI/NRI/DRI (triple reuptake inhibitor), a serotonin receptor antagonist, or any combination thereof);

1.39. Composition 1.37, wherein the one or more antidepressant agents are selected from citalopram, escitalopram, paroxetine, fluoxetine, fluvoxamine, sertraline, venlafaxine, desvenlafaxine, duloxetine, levomilnacipran, milnacipran, vilazodone, vortioxetine, nefazodone, trazodone, atomoxetine, reboxetine, teniloxazine, viloxazine, bupropion, tofenacin, amitriptyline, amitriptyline N-oxide, clomipramine, desipramine, dibenzepin, dimetacrine, dosulepin, doxepin, imipramine, lofepramine, melitracen, nitroxazepine, nortriptyline, noxiptiline, opipramol, pipofezine, protriptyline, trimipramine, amoxapine, maprotiline, mirtazapine, mianserin, and setiptiline;

1.40. Composition 1.27-1.39, wherein the condition to be treated is selected from bipolar depression and major depressive disorder;

1.41. Any foregoing Composition wherein the 5-$HT_{2A}$ or 5-$HT_{2A}$/D2 receptor ligand and the nitric oxide donor are provided in a fixed combination unit dosage form;

1.42. Any foregoing Composition, wherein the 5-$HT_{2A}$ or 5-$HT_{2A}$/D2 receptor ligand has an $IC_{50}$ of less than 250 nM or an $EC_{50}$ of less than 250 nM for activity (agonism and/or antagonism) at the 5-$HT_{2A}$ receptor, e.g., an $IC_{50}$ or $EC_{50}$ of less than 200 nM, or less than 150 nM, or less than 100 nM, or less than 75 nM, or less than 60 nM, or less than 50 nM, or less than 40 nM, or less than 30 nM, or less than 20 nM, for activity at said receptor (agonism or antagonism);

1.43. Any foregoing Composition, wherein the 5-$HT_{2A}$ or 5-$HT_{2A}$/D2 receptor ligand has an $IC_{50}$ of less than 250 nM or an $EC_{50}$ of less than 250 nM for activity (agonism and/or antagonism) at the D2 receptor, e.g., an $IC_{50}$ or $EC_{50}$ of less than 200 nM, or less than 150 nM, or less than 100 nM, or less than 75 nM, or less than 60 nM, or less than 50 nM, or less than 40 nM, or less than 30 nM, or less than 20 nM, for activity at said receptor (agonism or antagonism);

1.44. Any foregoing Composition, wherein the 5-$HT_{2A}$ or 5-$HT_{2A}$/D2 receptor ligand has an $IC_{50}$ of less than 250 nM or an $EC_{50}$ of less than 250 nM for activity (agonism and/or antagonism) at the D1 receptor, e.g., an $IC_{50}$ or $EC_{50}$ of less than 200 nM, or less than 150 nM, or less than 100 nM, or less than 75 nM, or less than 60 nM, or less than 50 nM, or less than 40 nM, or less than 30 nM, or less than 20 nM, for activity at said receptor (agonism or antagonism);

1.45. Any foregoing Composition, wherein the 5-$HT_{2A}$ or 5-$HT_{2A}$/D2 receptor ligand has an $IC_{50}$ of less than 250 nM or an $EC_{50}$ of less than 250 nM for activity (agonism and/or antagonism) at the serotonin transporter (SERT), e.g., an $IC_{50}$ or $EC_{50}$ of less than 200 nM, or less than 150 nM, or less than 100 nM, or less than 75 nM, or less than 60 nM, or less than 50 nM, or less than 40 nM, or less than 30 nM, or less than 20 nM, for activity at said transporter (agonism or antagonism);

1.46. Any foregoing Composition, is in the form of a long-acting injectable (LAI) composition, e.g., for intramuscular or subcutaneous injection;

1.47. Composition 1.46, wherein the 5-$HT_{2A}$ or 5-$HT_{2A}$/D2 receptor ligand is a Compound of Formula I and the LAI composition comprises said Compound in an amount sufficient to provide the equivalent of a daily dose of 1 to 100 mg of free base, e.g., 1 to 75 mg, or 1 to 60 mg, or 1 to 40 mg, or 1 to 20 mg, or 1 to 10 mg, of free base, released over a period of time ranging from about 1 week to about 3 months, e.g., about 1 week to about 8 weeks, or about 1 week to about 6 weeks, or about 1 week to about 4 weeks, or about 1 week to about 3 weeks, or about 1 week to about 2 weeks;

1.48. Composition 1.47, wherein the LAI composition comprises the compound of Formula I dissolved, dispersed, suspended, or encapsulated in a polymeric matrix;

1.49. Composition 1.48, wherein the polymeric matrix comprises one or more biocompatible and biodegradable polymers as defined herein, e.g., poly(hydroxycarboxylic acids), poly(amino acids), cellulose polymers, modified cellulose polymers, polyamides, and polyesters;

1.50. Composition 1.49, wherein the one or more polymers comprises polylactic acid, poly(glycolic acid), poly(citric acid), poly(malic acid), poly(beta-hydroxybutyric acid), poly(lactic acid-glycolic acid) copolymer, 2-hydroxybutyric acid-glycolic acid copolymer, polylactic acid-polyethylene glycol copolymer, polyglycolic acid-polyethylene glycol copolymer, poly (alkyl alpha-cyanoacrylate) such as poly(butyl cyanoacrylate) or poly(2-octyl cyanoacrylate), poly(ortho ester), polycarbonate, polyortho-carbonate, a polyamino acid, (for example poly-gamma.-L-alanine, poly-.gamma.-benzyl-L-glutamic acid or poly-y-methyl-L-glutamic acid), and/or hyaluronic acid ester;

1.51. Composition 1.49, wherein the one or more polymers comprises poly(lactic acid), poly(glycolic acid), poly(citric acid), poly(malic acid), or a poly(lactic acid-glycolic acid) copolymer;

1.52. Composition 1.49, wherein the one or more polymers comprises a poly(lactic acid-glycolic acid) copolymer, e.g., poly-d,l-lactide-co-glycolide.

The term "5-$HT_{2A}$ receptor ligand" refers to a compound which displays, at least, pharmacological activity at the serotonin 5-$HT_{2A}$ receptor, for example, compounds having an $IC_{50}$ of less than 250 nM or an $EC_{50}$ of less than 250 nM for activity (agonism and/or antagonism) at said receptor. In some embodiments, this term refers to a compound having an $IC_{50}$ or $EC_{50}$ of less than 200 nM, or less than 150 nM, or less than 100 nM, or less than 75 nM, or less than 60 nM, or less than 50 nM, or less than 40 nM, or less than 30 nM, or less than 20 nM, for activity at said receptor (agonism or antagonism).

The term "5-$HT_{2A}$/D2 receptor ligand" refers to a compound which displays, at least, pharmacological activity at both the serotonin 5-$HT_{2A}$ receptor and at the D2 receptor, for example, compounds having an $IC_{50}$ of less than 250 nM or an $EC_{50}$ of less than 250 nM for activity (agonism and/or antagonism) at each of said receptors. In some embodiments, this term refers to a compound having an $IC_{50}$ or $EC_{50}$ of less than 200 nM, or less than 150 nM, or less than 100 nM, or less than 75 nM, or less than 60 nM, or less than 50 nM, or less than 40 nM, or less than 30 nM, or less than 20 nM, for activity at one or both of these receptors (agonism or antagonism).

The words "treatment" and "treating" are to be understood accordingly as embracing prophylaxis and treatment or amelioration of symptoms of disease and/or treatment of the cause of the disease. In particular embodiments, the words "treatment" and "treating" refer to prophylaxis or amelioration of symptoms of the disease.

The term "patient" may include a human or non-human patient.

The Diagnostic and Statistical Manual of Mental Disorders, 5th Edition ("DSM-5") includes a class of disorders termed psychotic disorders, and these include schizophrenia, schizophreniform disorder, schizoaffective disorder, delusional disorder, brief psychotic disorder, psychotic disorder due to another condition, substance- or medication-induced psychotic disorder, and unspecified schizophrenia spectrum and other psychotic disorder.

DSM-5 defines schizophrenia as being characterized by delusions, hallucinations, disorganized speech (frequent derailment or incoherence), disorganized or catatonic behavior, and negative symptoms (such as diminished emotional expression). For a clinician to make a diagnosis of schizophrenia, at least two of a set of specific symptoms must be present for at least six months total, and at least one month actively (active phase symptoms). In addition, for a significant portion of time since the onset of the disturbance, the patient must dysfunction in at least one major area of social or occupational functioning, such as work or academics, interpersonal relations, or self-care. A patient who meets the basic criteria except for having active-phase symptoms is said to be experiencing prodromal phase or residual phase. During these two phases, the signs of the disturbance are often limited solely to negative symptoms.

The DSM 5 defines "major depressive disorder" (MDD) as having five or more of a set of symptoms during the same two-week period of time, which symptoms represent a change from the patient's previous functioning. The five symptoms are selected from depressed mood, markedly diminished interest or pleasure in almost all activities, significant weight changes, insomnia or hyposomnia, psychomotor agitation or retardation, fatigue, feelings of worthlessness or excessive guilt, diminished ability to think or indecisiveness, and recurrent thoughts of death or suicidal ideation, wherein each of such symptoms is present nearly every day. At a minimum, MDD diagnosis requires at least depressed mood or loss of interest or pleasure as one of the five symptoms. MDD may consist of one or more "major depressive episodes" which can be spaced many weeks or months apart (more than 2 weeks apart to qualify as separate episodes). The DSM-5 notes that there is a risk of suicidal behavior at all time during a major depressive episode.

By its nature, MDD is an acute disorder in so far as the DSM-5 distinguishes it from "persistent depressive disorder", in which a patient has many of the same symptoms as for MDD, but which persists for at least a 2-year period. In addition to MDD, the DSM-5 also defines a "short-duration depressive episode" as having a depressed affect and at least four of the other symptoms which define MDD for at least 4 days, but less than 14 days. The DSM further defines "recurrent brief depression" as the concurrent presence of depressed mood and at least four other symptoms of depression for 2 to 13 days at least once per month, and persisting for at least 12 consecutive months. Thus, recurrent brief depression similarly consists of brief episodes of depression which recur regularly.

The DSM-5 also includes major depressive episodes as one of the diagnostic criteria for a patient suffering from bipolar disorder. Thus, a patient presenting a major depressive episode may be suffering from either major depressive disorder or bipolar disorder.

The DSM-5 defines a variety of anxiety disorders, including generalized anxiety disorder, panic disorder, social anxiety disorder, and specific phobias. Like the depressive disorders discussed above, anxiety disorders can be marked by recurrent episodes of short duration, such as panic attacks, which may persist over the course of a chronic disorder. For example, generalized anxiety disorder is defined by the DSM-5 to require excessive anxiety and worry occurring more days that not for at least 6 months, about a number of events or activities. A panic attack is defined as an abrupt surge of intense fear or intense discomfort that reaches a peak within minutes, but it can repeatedly recur in response to either expected stimuli or unexpected stimuli. Thus, as for the depressive disorders described above, there is a need for rapidly-acting anxiolytic agents that can treat the symptoms of anxiety or panic, yet some of the most common treatments for anxiety disorders are the SSRIs and other antidepressant agents which take 2-4 weeks to provide relief.

Social avoidance can be a critical and debilitating symptom in patients suffering from anxiety disorders, especially social anxiety disorder, as well as in patients suffering from traumatic anxiety disorders. Social avoidance is often one of the key determinants of whether a person with a severe anxiety disorder is capable of maintaining familial relationships or employment relationships. It has been unexpectedly found that certain substituted fused gamma carbolines having $5\text{-HT}_{2A}$ and dopamine receptor activity, such as lumateperone, are effective in treating the emotional experience symptoms of psychiatric disorders (e.g., the emotional experience negative symptoms of schizophrenics). Negative symptoms of schizophrenia can be divided into two categories: emotional experience (e.g., emotional withdrawal, passive social withdrawal, active social avoidance) and emotional expression (e.g., blunted effect, poor rapport, lack of spontaneity, and motor retardation). In two clinical studies of patients with acute exacerbated schizophrenia, administration of lumateperone once daily (60 mg P.O.), for up to 28 days, resulted in a significant and unexpected improvement in symptoms of emotional experience compared to placebo. These are the symptoms that are most highly correlated with interpersonal functioning. As such, such compounds, including the compounds of Formula I, may be highly effective in treating the emotional experience symptoms of other psychiatric disorders, such as social anxiety disorders, or any other psychiatric disorders in which social withdrawal and social avoidance are symptoms.

If not otherwise specified or clear from context, the following terms herein have the following meanings:

"Alkyl" as used herein is a saturated or unsaturated hydrocarbon moiety, e.g., one to twenty-one carbon atoms in length, which may be linear or branched (e.g., n-butyl or tert-butyl), preferably linear, unless otherwise specified. For example, "$C_{1-21}$alkyl" denotes alkyl having 1 to 21 carbon atoms. In one embodiment, alkyl is optionally substituted with one or more hydroxy or $C_{1-22}$ alkoxy (e.g., ethoxy) groups. In another embodiment, alkyl contains 1 to 21 carbon atoms, preferably straight chain and optionally saturated or unsaturated, for example $R_1$ is an alkyl chain containing 1 to 21 carbon atoms, preferably 6-15 carbon atoms, 16-21 carbon atoms, e.g., so that together with the —C(O)— to which it attaches, e.g., when cleaved from the compound of Formula I, forms the residue of a natural or unnatural, saturated or unsaturated fatty acid.

The $5\text{-HT}_{2A}$ or $5\text{-HT}_{2A}$/D2 receptor ligand, for example a substituted heterocycle fused gamma-carbolines as described herein may be in free, pharmaceutically acceptable salt or prodrug form. Pharmaceutically acceptable salts include, for example, the tosylate salts in the case of Compounds of Formula I. Where dosages or amounts of a salt are given by weight, e.g., milligrams per day or milligrams per unit dose, the dosage amount of the salt is given as the weight of the corresponding free base, unless otherwise indicated.

In any and all embodiments described herein, the 5-HT$_{2A}$ or 5-HT$_{2A}$/D2 receptor ligand may also be a SERT ligand, i.e., said compounds may be a 5-HT$_{2A}$/SERT or a 5-HT$_{2A}$/D2/SERT receptor ligand.

In any and all embodiments described herein, the 5-HT$_{2A}$ or 5-HT$_{2A}$/D2 receptor ligand may be free or substantially free of any opioid receptor activity (e.g., free or substantially free of mu-opioid receptor activity, e.g., having an IC$_{50}$ greater than 50 nM or greater than 100 nM or greater than 150 nM).

The 5-HT$_{2A}$ or 5-HT$_{2A}$/D2 receptor ligand may in some cases also exist in prodrug form. A prodrug form is compound which converts in the body to the active compound. For example, compounds which contain hydroxy or carboxy substituents may form physiologically hydrolysable and acceptable esters. As used herein, "physiologically hydrolysable and acceptable ester" means esters which are hydrolysable under physiological conditions to yield acids (in the case of compounds which have hydroxy substituents) or alcohols (in the case of compounds which have carboxy substituents) which are themselves physiologically tolerable at doses to be administered. For example, wherein Y of the compound of Formula I is —C(H)(OR$_1$), and R$_1$ is —C(O)—C$_{1-21}$alkyl, e.g., —C(O)—C$_3$alkyl or —C(O)—C$_9$alkyl, these compounds may hydrolyze under physiological condition to yield a compound of Formula I wherein Y is —C(H)(OH) on the one hand and C$_{1-21}$alkyl-C(O)OH, e.g., C$_3$alkyl-C(O)OH or C$_9$alkyl-C(O)OH on the other hand. As will be appreciated the term thus embraces conventional pharmaceutical prodrug forms. Wherein a prodrug (e.g., the compound of formula (I) wherein R$_1$ is —C(O)—C$_{1-21}$alkyl) is used, the dosage amount is calculated based on the amount of the compound of formula (I) wherein Y is —C(=O)— or —CH(OH)—, in free base form.

Nitric oxide donors include compounds bearing alkyl nitrate groups, alkyl nitrite groups, S-nitroso compounds, N-nitroso compounds, diazeniumdiolate, and furoxan compounds. In some embodiments, the nitric oxide donor is a compound which generate nitric oxide in vivo spontaneously, i.e., via non-enzymatic hydrolysis, decomposition, or other mechanisms. In other embodiments, the nitric oxide donor is a compound which requires enzymatic action to release nitric oxide, such as bioactivation. For example, C-nitroso compounds, such as typical alkyl nitrate esters (R—O—NO$_2$), are thought to require enzymatic action such as reduction, denitration and/or other steps to generate NO in vivo. Enzymes such as mitochondrial aldehyde dehydrogenase, glutathione S-transferase, cytochrome P450 oxidase, and xanthine oxidoreductase have been implicated, although recent evidence favors a role for mitochondrial aldehyde dehydrogenase. S-nitroso compounds are also thought to require enzymatic action to generate NO in vivo. In contrast, diazeniumdiolate compounds release NO at repeatable first-order rates upon dissolution in aqueous media. These compounds do not require any enzymatic or redox chemistry.

Diazeniumdiolates are compounds having the tautomeric —N—(NO)=(NO) or —N—N(O)—N=O functional groups, thus also giving them their alternative name NONOates. These compounds undergo simple hydrolysis to yield nitric oxide, ideally, two equivalents.

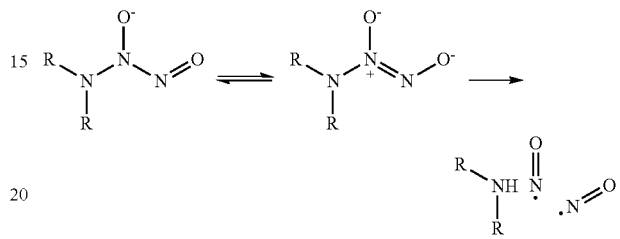

These compounds can be derived from most primary or secondary amines, and their rates of hydrolysis to release NO depend upon the structure of the organic side groups (R in the scheme above). Commonly, these compounds are derived from small primary and secondary alkyl amines and cyclic secondary amines. Normal (unprotected) diazeniumdiolates are anionic and are thus commonly provided as a salt with a suitable cation (such as an ammonium or alkali metal cation, or a mono- or -dialkyl ammonium cation corresponding to the amino group of the diazeniumdiolate).

Terminal oxygen (O$^2$)-protected diazeniumdiolates are also known, which provide slower and more prolonged release of NO due to the requirement for a hydrolytic or enzymatic deprotection step to provide the reactive diazeniumdiolate compound. Both vinyl- and aryl-O$^2$-protected diazeniumdiolates have been developed. These compounds can also be activated in vivo by reaction with the SH group of glutathione. Acetoxymethyl protected diazeniumdiolate is particularly useful because it can be activated by common esterase enzymes.

Unique among nitric oxide donors is sodium nitroprusside, Na$_2$[Fe(CN)$_5$NO], a complex coordination compound comprising an iron(III) center coordinated to five cyanide ligands and one nitric oxide ligand. Upon binding to oxyhemoglobin in red blood cells, the complex dissociates to release cyanide and nitric oxide.

Molsidomine is another unique nitric oxide donor drug, and it is a prodrug of the active species linsidomine. Molsidomine and linsidomine bear a mesionic N-morphilino-5-aminoacyl 1,2,3-oxadiaozole ring. Upon enzymatic cleavage of molsidomine's carbamate group in vivo, linsidomine forms. This compound is unstable and breaks down to release NO.

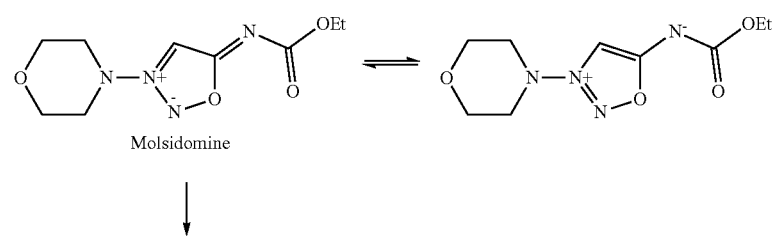

Molsidomine

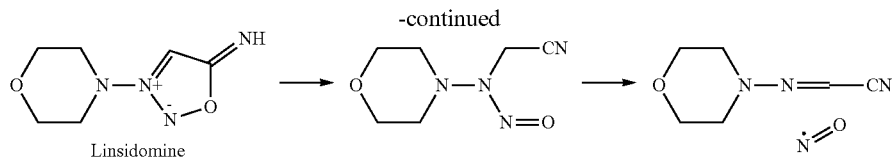

Linsidomine

NO hybrid drugs are existing drugs, including analgesics, non-steroidal anti-inflammatories, anti-cholesterol statins, and antiviral agents, which bear a free hydroxy, amino, thiol, or other group which can be covalently linked to a nitric oxide donating moiety (commonly an alkyl nitrate). For example, aspirin (2-acetylsalicylic acid) has been converted into two different NO-aspirin derivatives. Each of these compounds undergoes in vivo release of NO to regenerate the underlying drug (aspirin) which continues to have its normal in vivo pharmacological activity.

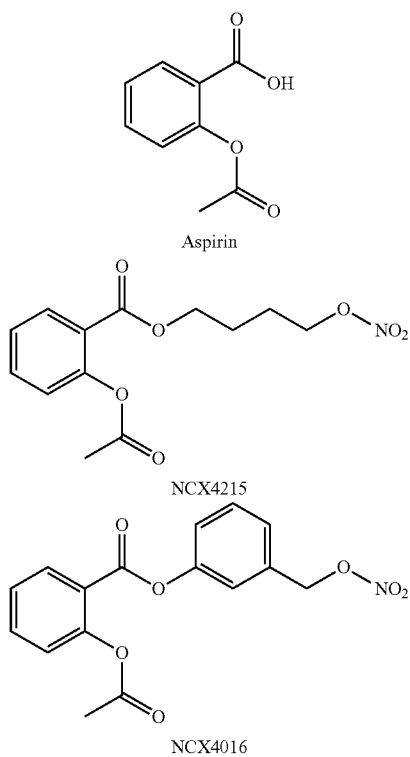

Examples of suitable nitric oxide donors include, without limitation, sodium nitroprusside (SNP), nitroglycerin (glyceryl trinitrate or GTN), amyl nitrate, diethylene glycol dinitrate, isosorbide mononitrate (ISMN), isosorbide dinitrate (ISDN), itramin tosylate, pentaerythritol tetranitrate (PETN), propatyl nitrate, sinitrodil, tenitramine, trolnitrate, molsidomine, linsidomine, naproxcinod, amyl nitrite, diethylamine diazeniumdiolate (DEA/NO), diethylaminetriamine diazeniumdiolate (DETA/NO), spermine diazeniumdiolate (SPER/NO), proline diazeniumdiolate (PROLI/NO), dipropyltriamine diazeniumdiolate (DPTA/NO), methylamine hexamethylene methylamine diazeniumdiolate (MAHMA/NO), propylamine propylamine diazeniumdiolate (PAPA/NO or NOC-15), isopropylamine propylamine diazeniumdiolate (IPAPA/NO or NOC-5), isopropylamine diazeniumdiolate (IPA/NO), heparin diazeniumdiolate, pyrrolidine diazeniumdiolate (PYRRO/NO), $O^2$-vinyl-1-(pyrrolidin-1-yl)diazen-1-ium-1,2-diolate (V-PYRRO/NO), $O^2$-vinyl-1-isopropyl-diazen-1-ium-1,2-diolate (V-IPA/NO), $O^2$-vinyl-[2-(carboxylato)pyrrolidin-1-yl]diazen-1-ium-1,2-diolate (V-PROLI/NO), $O^2$-(2,4-dinitrophenyl)-1-[(4-ethoxycarbonyl)piperazin-1-yl]diazen-1-ium-1,2-diolate (JS-K), $O^2$-vinyl-1-[(4-ethoxycarbonyl)piperazin-1-yl]diazen-1-ium-1,2-diolate, $O^2$-acetoxymethyl-isopropyldiazen-1-ium-1,2-diolate (AcOM-IPA/NO), S-nitrosoglutathione (GSNO), S-nitroso-N-acetylpenicillamine (SNAP), S-nitroso-N-valerylpenicillamine (SNVP), S-nitroso-N-acetylcysteine (SNAC), S-nitrosoalbumin, and NO hybrid drugs (e.g., 2-(acetyloxy)-benzoic acid 3-[(nitrooxy)methyl]phenyl ester (NCX4016), 5-nitrooxypentyl 2-acetyloxybenzoate (NCX4215), nicorandil (2-nicotinamidoethyl nitrate), nipradilol (K-351), NO-pravastatin, NO-fluvastatin, NO-losartan, NO-indomethacin, NO-ibuprofen, NO-sulindac, NO-naproxen, S-nitroso-diclofenac, and S-nitroso-captopril.

In some embodiments, the nitric oxide donor is selected from sodium nitroprusside (SNP), nitroglycerin (glyceryl trinitrate), amyl nitrate, diethylene glycol dinitrate, isosorbide mononitrate, isosorbide dinitrate, itramin tosylate, pentaerythritol tetranitrate, propatyl nitrate, sinitrodil, tenitramine, trolnitrate, molsidomine, linsidomine, and naproxcinod.

The term "concurrently" when referring to a therapeutic use means administration of two or more active ingredients to a patient as part of a regimen for the treatment of a disease or disorder, whether the two or more active agents are given at the same or different times or whether given by the same or different routes of administrations. Concurrent administration of the two or more active ingredients may be at different times on the same day, or on different dates or at different frequencies.

The term "simultaneously" when referring to a therapeutic use means administration of two or more active ingredients at or about the same time by the same route of administration.

The term "separately" when referring to a therapeutic use means administration of two or more active ingredients at or about the same time by different route of administration.

Dosages employed in practicing the present disclosure will of course vary depending, e.g. on the particular disease or condition to be treated, the particular active compounds used, the mode of administration, and the therapy desired. Unless otherwise indicated, an amount of an active compound for administration (whether administered as a free base or as a salt form) refers to or is based on the amount of the compound in free form (i.e., the calculation of the amount is based on the amount of active moiety in free form, not taking into account the weight of the counter ion in the case of a salt). Wherein a prodrug (e.g., the compound of formula (I) wherein $R_1$ is —C(O)—$C_{1-21}$alkyl) is used, the dosage amount is calculated based on the amount of the compound of formula (I) wherein Y is C(=O) in free base form. The 5-$HT_{2A}$ or 5-$HT_{2A}$/D2 receptor ligand may be administered by any suitable route, including orally, intramuscularly, subcutaneously, parenterally or transdermally, but are preferably administered orally. The $5\text{-HT}_{2A}$ or $5\text{-HT}_{2A}/D2$ receptor ligand may be administered by any suitable route, including oral, parenteral, transdermal, or transmucosal, for example in the form of a tablet, a capsule, a subcutaneous injection, or an oral, rapidly disintegrating tablet or film for sublingual or buccal administration.

For the avoidance of doubt, any disclosure of a numerical range, e.g., "up to X" amount is intended to include the upper numerical limit X. Therefore, a disclosure of "up to 60 mg" is intended to include 60 mg.

Pharmaceutical compositions comprising compounds of the Disclosure may be prepared using conventional diluents or excipients and techniques known in the galenic art. Thus, oral dosage forms may include tablets, capsules, solutions, suspensions and the like.

Compounds of the present disclosure may be included as a depot formulation, e.g., by dispersing, dissolving, suspending, or encapsulating the Compounds of the Invention in a polymeric matrix as described in herein, such that the Compound is continually released as the polymer degrades over time. The release of the Compounds of the Invention from the polymeric matrix provides for the controlled- and/or delayed- and/or sustained-release of the Compounds, e.g., from the pharmaceutical depot composition, into a subject, for example a warm-blooded animal such as man, to which the pharmaceutical depot is administered. Thus, the pharmaceutical depot delivers the Compounds of the Invention to the subject at concentrations effective for treatment of the particular disease or medical condition over a sustained period of time, e.g., 1 week to 3 months.

Polymers useful for the polymeric matrix in the Composition of the Invention (e.g., Depot composition of the Invention) may include a polyester of a hydroxyfatty acid and derivatives thereof or other agents such as polylactic acid, polyglycolic acid, polycitric acid, polymalic acid, poly-beta.-hydroxybutyric acid, epsilon.-capro-lactone ring opening polymer, lactic acid-glycolic acid copolymer, 2-hydroxybutyric acid-glycolic acid copolymer, polylactic acid-polyethyleneglycol copolymer or polyglycolic acid-polyethyleneglycol copolymer), a polymer of an alkyl alpha-cyanoacrylate (for example poly(butyl 2-cyanoacrylate)), a polyalkylene oxalate (for example polytrimethylene oxalate or polytetramethylene oxalate), a polyortho ester, a polycarbonate (for example polyethylene carbonate or polyethylenepropylene carbonate), a polyortho-carbonate, a polyamino acid (for example poly-gamma.-L-alanine, poly-.gamma.-benzyl-L-glutamic acid or poly-y-methyl-L-glutamic acid), a hyaluronic acid ester, and the like, and one or more of these polymers can be used.

If the polymers are copolymers, they may be any of random, block and/or graft copolymers. When the above alpha-hydroxycarboxylic acids, hydroxydicarboxylic acids and hydroxytricarboxylic acids have optical activity in their molecules, any one of D-isomers, L-isomers and/or DL-isomers may be used. Among others, alpha-hydroxycarboxylic acid polymer (preferably lactic acid-glycolic acid polymer), its ester, poly-alpha-cyanoacrylic acid esters, etc. may be used, and lactic acid-glycolic acid copolymer (also referred to as poly(lactide-alpha-glycolide) or poly(lactic-co-glycolic acid), and hereinafter referred to as PLGA) are preferred. Thus, in one aspect the polymer useful for the polymeric matrix is PLGA. As used herein, the term PLGA includes polymers of lactic acid (also referred to as polylactide, poly(lactic acid), or PLA). Most preferably, the polymer is the biodegradable poly(d,l-lactide-co-glycolide) polymer, such as PLGA 50:50, PLGA 85:15 and PLGA 90:10.

In a preferred embodiment, the polymeric matrix of the invention is a biocompatible and biodegradable polymeric material. The term "biocompatible" is defined as a polymeric material that is not toxic, is not carcinogenic, and does not significantly induce inflammation in body tissues. The matrix material should be biodegradable wherein the polymeric material should degrade by bodily processes to products readily disposable by the body and should not accumulate in the body. The products of the biodegradation should also be biocompatible with the body in that the polymeric matrix is biocompatible with the body. Particular useful examples of polymeric matrix materials include poly (glycolic acid), poly-D,L-lactic acid, poly-L-lactic acid, copolymers of the foregoing, poly(aliphatic carboxylic acids), copolyoxalates, polycaprolactone, polydioxanone, poly(ortho carbonates), poly(acetals), poly(lactic acid-caprolactone), polyorthoesters, poly(glycolic acid-caprolactone), polyanhydrides, and natural polymers including albumin, casein, and waxes, such as, glycerol mono- and distearate, and the like. The preferred polymer for use in the practice of this invention is dl(polylactide-co-glycolide). It is preferred that the molar ratio of lactide to glycolide in such a copolymer be in the range of from about 75:25 to 50:50.

Useful PLGA polymers may have a weight-average molecular weight of from about 5,000 to 500,000 Daltons, preferably about 150,000 Daltons. Dependent on the rate of degradation to be achieved, different molecular weight of polymers may be used. For a diffusional mechanism of drug release, the polymer should remain intact until all of the drug is released from the polymeric matrix and then degrade. The drug can also be released from the polymeric matrix as the polymeric excipient bioerodes.

The PLGA may be prepared by any conventional method, or may be commercially available. For example, PLGA can be produced by ring-opening polymerization with a suitable catalyst from cyclic lactide, glycolide, etc. (see EP-0058481B2; Effects of polymerization variables on PLGA properties: molecular weight, composition and chain structure).

It is believed that PLGA is biodegradable by means of the degradation of the entire solid polymer composition, due to the break-down of hydrolysable and enzymatically cleavable ester linkages under biological conditions (for example in the presence of water and biological enzymes found in tissues of warm-blooded animals such as humans) to form lactic acid and glycolic acid. Both lactic acid and glycolic acid are water-soluble, non-toxic products of normal metabolism, which may further biodegrade to form carbon dioxide and water. In other words, PLGA is believed to degrade by means of hydrolysis of its ester groups in the presence of water, for example in the body of a warm-blooded animal such as man, to produce lactic acid and glycolic acid and create the acidic microclimate. Lactic and glycolic acid are by-products of various metabolic pathways in the body of a warm-blooded animal such as man under normal physiological conditions and therefore are well tolerated and produce minimal systemic toxicity.

Example 1: Lumateperone Provides Synergistic Improvement in Conditioned Avoidance Response (CAR) when Combined with Sodium Nitroprusside The Compound of Formula I, wherein X is $N(CH_3)$, Y is C=O, is lumateperone (ITI-007):

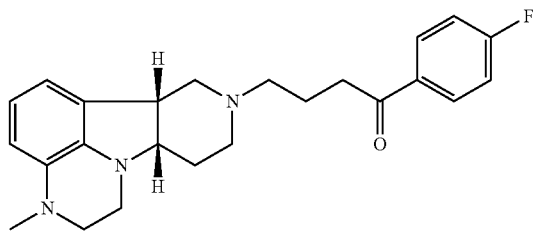 [SMILES: CN1CCN2c3c(cccc31)[C@@H]1CN(CCCC(=O)c3ccc(F)cc3)CC[C@@H]12]

in the form of its tosylate salt is solid as CAPLYTA®. Lumateperone provides selective and simultaneous modulation of serotonin, dopamine and glutamate neurotransmission and is particularly of interest in the context of psychiatric disorders.

Male Wistar rats weighing about 18 g on arrival are housed in groups of four in standard laboratory conditions at room temperature. Cages are enriched with wooden houses and paper for nesting. Food and water are provided ad libitum. Animals are kept on a reversed 12:12h light/dark cycle (lights off at 6:00 AM). The animals are acclimatized for at least two weeks before experiments or training starts.

Rats are trained and tested in a conventional shuttle-box apparatus divided into two compartments of equal size by a plastic divider with an opening in the middle. Before testing, the rats are habituated to the shuttle box for five minutes. When an 80-dB white noise conditioned stimulus (CS) is presented to the rats, they have 10 seconds to move from one compartment of the shuttle-box into the other. If they do this, it is termed "avoidance." If the rat remains in the same compartment for more than 10 seconds, an intermittent electric shock (approximately 0.4 mA), the unconditioned stimulus (UCS), is presented in the grid floor until an escape is performed. When the rat moves to the other compartment, both the noise and any shocking stops. The shock is provided for a 0.5 second duration and repeated at 2.5 second intervals. If the animal does not respond within 50 seconds of the shock period, the trial is terminated (escape failure). If 3 escape failures occur in a row, the session is stopped. Animals are trained daily for five days, each session consisting of approximately 20 random trials over 15 minutes. Rats must reach an 85% avoidance rate to be included in the study. Experimental sessions last 10 minutes and are performed before any drugs are administered (pre-test), and 20 minutes, 90 minutes and 240 minutes after injection of any drugs. Experimental days were separated by at least two non-experimental days.

The data from CAR is analyzed by Friedman's analysis of variance (ANOVA), and if significant differences appear then Wilcoxon matched-pairs signs-ranks tests are performed as a follow-up test. All data is presented as median+ interquartile range.

Lumateperone tosylate is dissolved in a vehicle of 5% dimethylsulfoxide, 5% Tween 20, 15% PEG-400 and distilled water. SNP is dissolved in normal saline (0.9% NaCl) and kept in the dark until injection (it is photosensitive). All drugs are administered intraperitoneally at a volume of 1 ml/kg. Rats are dosed at either 1 mg/kg, 3 mg/kg, 7 mg/kg, or 10 mg/kg lumateperone tosylate depending on the experiment. As a control, rats are dosed with 0.4 mg/kg risperidone.

Figure 2:
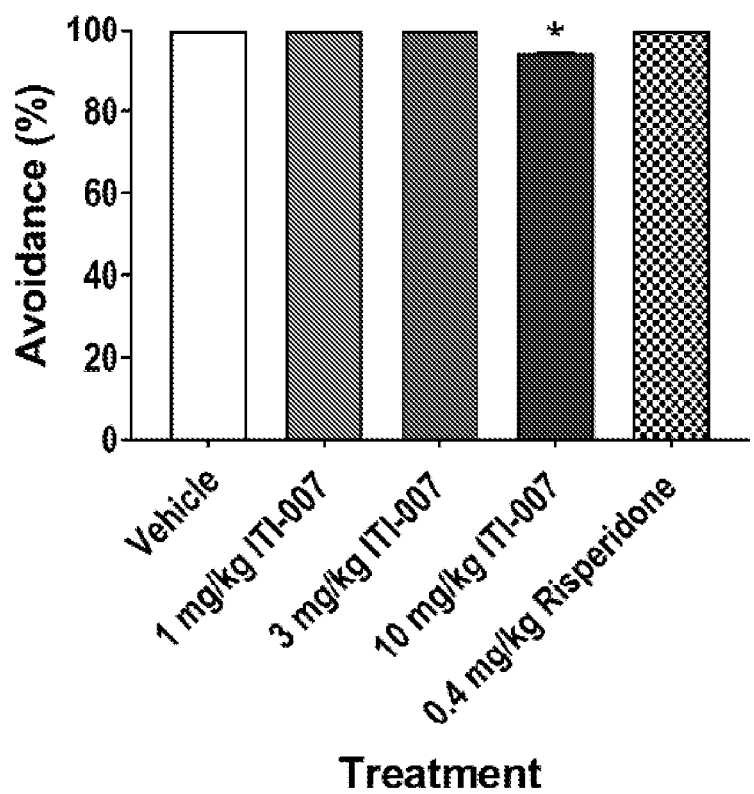
FIG. 2. CAR in male Wister rats 90 minutes after treatment with vehicle, lumateperone (1 mg/kg, 3 mg/kg or 10 mg/kg) or risperidone (0.4 mg/kg). * $p<0.05$ compared to vehicle+saline; n=11.

For treatment with lumateperone or risperidone alone, a significant effect of treatment is found in the CAR test 20 minutes after drug administration (p<0.0001), as shown in FIG. 1. Follow up tests show that lumateperone at 3 mg/kg and at 10 mg/kg significantly suppressed CAR compared to vehicle, as did risperidone. At 90 minutes, there was a significant treatment effect for lumateperone at 10 mg/kg, but not for the other doses or for risperidone, as shown in FIG. 2.

Figure 3:
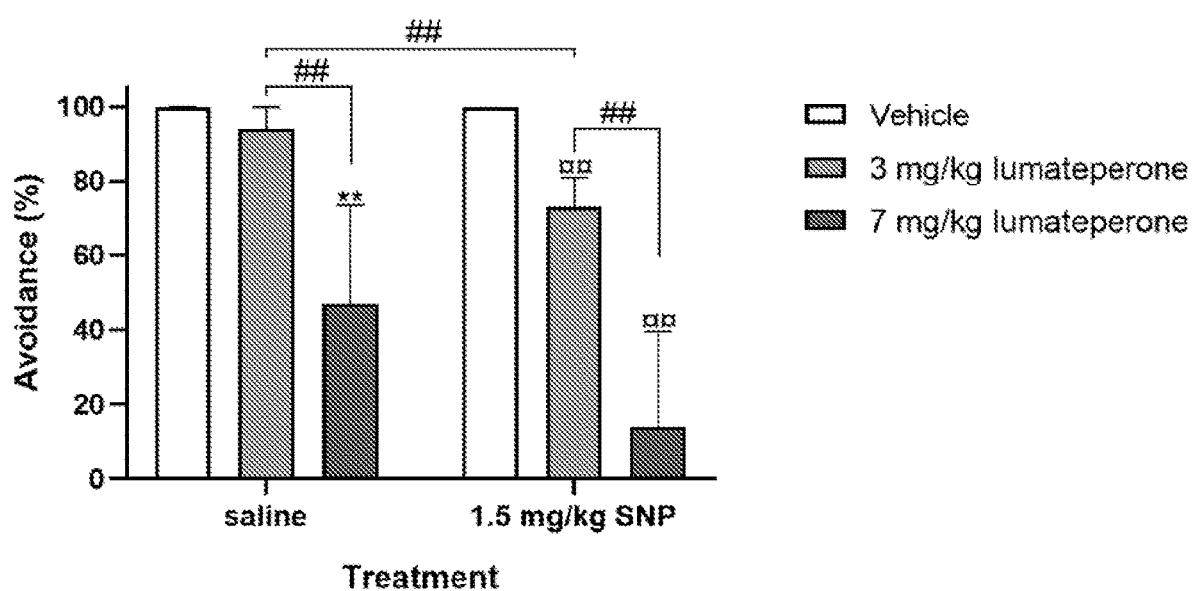
FIG. 3. CAR in male Wister rats 20 minutes after treatment with vehicle/saline, lumateperone (3 mg/kg or 7 mg/kg)/saline, vehicle/SNP (1.5 mg/kg), or lumateperone (3 mg/kg or 7 mg/kg)/SNP (1.5 mg/kg). ** $p<0.01$ compared to vehicle+saline; ¤¤ $p<0.01$ compared to vehicle+SNP; ## $p<0.01$ as indicated; n=11.

For treatment with the combination of lumateperone and SNP, a significant treatment effect was found 20 minutes after drug administration, as shown in FIG. 3. Follow-up tests show that lumateperone at 3 mg/kg and 7 mg/kg combined with SNP at 1.5 mg/kg provide significantly increased suppression of CAR compared to vehicle/SNP. Furthermore, lumateperone at 7 mg/kg significantly suppressed CAR compared to vehicle/saline. Lumateperone at 3 mg/kg with SNP was significantly different from lumateperone/saline and lumateperone (7 mg/kg)/SNP.

Figure 4:
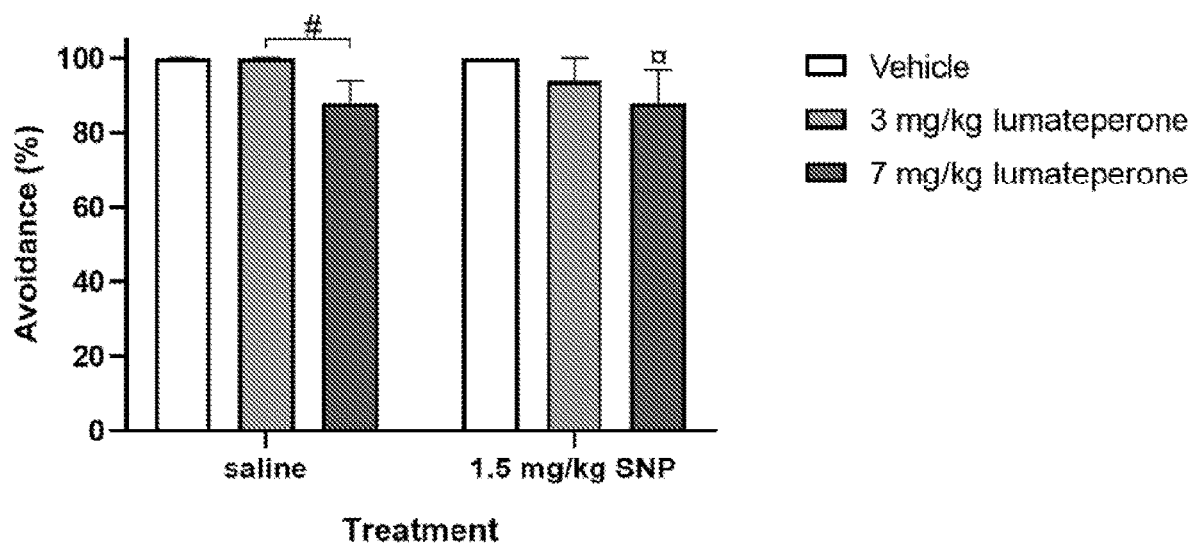
FIG. 4. CAR in male Wister rats 90 minutes after treatment with vehicle/saline, lumateperone (3 mg/kg or 7 mg/kg)/saline, vehicle/SNP (1.5 mg/kg), or lumateperone (3 mg/kg or 7 mg/kg)/SNP (1.5 mg/kg). ¤ $p<0.05$ compared to vehicle+SNP; # $p<0.05$ as indicated; n=11.

90 minutes after drug administration, a significant treatment effect was found, as shown in FIG. 4. Lumateperone at 7 mg/kg was significantly different than lumateperone (3 mg/kg)/saline and lumateperone (7 mg/kg)/SNP was significantly different from vehicle/saline.

Together, the data support any unexpected synergistic antipsychotic effect for the combination of lumateperone with SNP.

We claim:

1. A pharmaceutical composition comprising (i) an effective amount of a a Compound of Formula I:

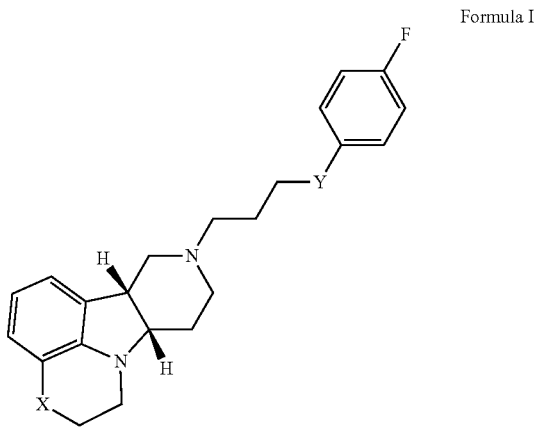

Formula I wherein:
X is —$N(CH_3)$—;
Y is —C(=O)—;
in free, or pharmaceutically acceptable salt form and (ii) an effective amount of a nitric oxide donor.

2. The composition according to claim 1, wherein the Compound of Formula I is in the form of the tosylate salt, optionally in crystalline form.

3. The composition according to claim 1, wherein the nitric oxide donor is selected from sodium nitroprusside (SNP), nitroglycerin (glyceryl trinitrate), amyl nitrate, diethylene glycol dinitrate, isosorbide mononitrate, isosorbide dinitrate, itramin tosylate, pentaerythritol tetranitrate, propatyl nitrate, sinitrodil, tenitramine, trolnitrate, molsidomine, linsidomine, and naproxcinod.

4. A method for the treatment of psychosis, depression, and/or anxiety, or other CNS disorders for which lumateperone has been shown to be effective, comprising administering (i) an effective amount of a Compound of Formula I:

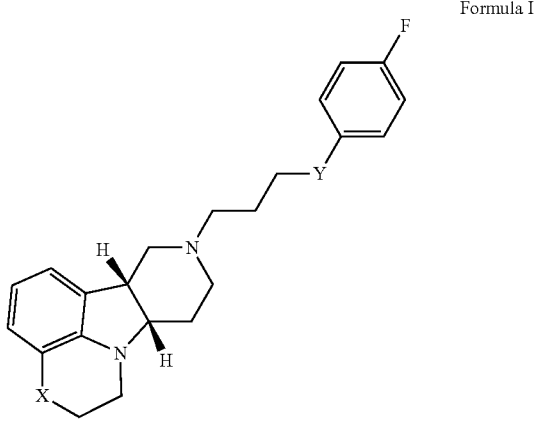

Formula I wherein:

X is —N(CH$_3$)—;

Y is —C(=O)—;

in free, or pharmaceutically acceptable salt form and (ii) an effective amount of a nitric oxide donor, separately (sequentially or simultaneously), or in combination.

5. The method according to claim 4, wherein the Compound of Formula I is in the form of the tosylate salt, optionally in crystalline form.

6. The method according to claim 5, wherein the tosylate salt is a monotosylate salt.

7. The method according to claim 4, wherein the nitric oxide donor is selected from sodium nitroprusside (SNP), nitroglycerin (glyceryl trinitrate), amyl nitrate, diethylene glycol dinitrate, isosorbide mononitrate, isosorbide dinitrate, itramin tosylate, pentaerythritol tetranitrate, propatyl nitrate, sinitrodil, tenitramine, trolnitrate, molsidomine, linsidomine, and naproxcinod.

8. The method according to claim 4, wherein the method comprises once daily administration of a unit dosage for oral administration, for example a tablet or capsule, comprising the compound of Formula I in an amount equivalent 1 to 100 mg of the monotosylate salt, and a pharmaceutically acceptable diluent or carrier.

9. The method according to claim 4, wherein the wherein the condition to be treated is psychosis, schizophrenia, delusional disorder, major depression with psychosis, bipolar disorder with psychotic symptoms, brief psychotic disorder, schizophreniform disorder, schizoaffective disorder, or psychosis caused by a medical condition or substance use.

10. The method according to claim 9, wherein the condition to be treated is symptoms of psychosis selected from: (1) negative symptoms, such as blunted affect, emotional withdrawal, poor rapport, passive or apathetic social withdrawal, difficulty in abstract thinking, lack of spontaneity and flow of conversation and stereotyped thinking; and (2) general psychopathology symptoms, such as somatic concern, anxiety, guilt feelings, tension, mannerisms and posturing, depression, motor retardation, uncooperativeness, unusual thought content, disorientation, poor attention, lack of judgment and insight, disturbance of volition, poor impulse control, preoccupation and active social avoidance; cognitive impairment and sleep disorders.

11. The method according to claim 9, wherein the psychosis is treatment-resistant psychosis, for example, psychosis which has not responded to treatment with one or more antipsychotic agents.

12. The method according to claim 4, wherein the patient has not responded to, or has not responded adequately to, or who suffers undesirable side effects from, treatment with another anti-psychotic agent or anti-depressant agent.

* * * * *